US009578112B2

(12) United States Patent
Zourzouvillys

(10) Patent No.: US 9,578,112 B2
(45) Date of Patent: Feb. 21, 2017

(54) RELIABILITY OF A CONNECTION DURING A COMMUNICATION SESSION ON A NETWORK DEVICE

(71) Applicant: Jive Communications, Inc., Orem, UT (US)

(72) Inventor: Theo Peter Zourzouvillys, Orem, UT (US)

(73) Assignee: JIVE COMMUNICATIONS, INC., Orem, UT (US)

( * ) Notice: Subject to any disclaimer, the term of this patent is extended or adjusted under 35 U.S.C. 154(b) by 0 days.

(21) Appl. No.: 14/335,171

(22) Filed: Jul. 18, 2014

(65) Prior Publication Data

US 2015/0319034 A1 Nov. 5, 2015

Related U.S. Application Data

(60) Provisional application No. 61/986,754, filed on Apr. 30, 2014.

(51) Int. Cl.
*H04L 29/08* (2006.01)
*H04L 12/24* (2006.01)
*H04L 29/12* (2006.01)
*H04M 7/00* (2006.01)
*H04L 29/06* (2006.01)
(Continued)

(52) U.S. Cl.
CPC ............. *H04L 67/148* (2013.01); *H04L 29/06* (2013.01); *H04L 41/0668* (2013.01); *H04L 61/2007* (2013.01); *H04L 65/1006* (2013.01); *H04L 69/40* (2013.01); *H04M 7/00* (2013.01); *H04M 7/0075* (2013.01); *H04L 41/0663* (2013.01);
(Continued)

(58) Field of Classification Search
CPC ............. H04L 41/0644; H04L 41/0663; H04L 41/0668; H04L 41/0681; H04L 69/40; G06F 11/16; G06F 11/2002; G06F 11/2053
USPC .......... 370/228–229, 217–220; 709/238, 239
See application file for complete search history.

(56) References Cited

U.S. PATENT DOCUMENTS 6,145,090 A * 11/2000 Yamaguchi ......... H04L 41/0668
714/1
6,173,312 B1 * 1/2001 Atarashi ........... H04L 29/12009
370/409
(Continued)

FOREIGN PATENT DOCUMENTS

WO    WO 2015/167726    11/2015

OTHER PUBLICATIONS

International Search Report & Written Opinion issued in PCT/US2015/023150 mailed Jun. 30, 2015.
(Continued)

Primary Examiner — Warner Wong
(74) Attorney, Agent, or Firm — Keller Jolley Preece

(57) ABSTRACT

The present application details methods and systems for improving the reliability of a connection during a communication session on a network device. In one or more embodiments, the network device maps to and connects with multiple datacenters. For example, the network device connects with a primary datacenter and participates in a communication session via a primary media bridge connection while jointly being connected with a secondary datacenter. In addition, the network device can switch from the primary media bridge connection to a secondary media bridge connection if a fault is detected on the primary media bridge connection.

20 Claims, 11 Drawing Sheets

(51) Int. Cl.
   *H04L 29/14* (2006.01)
   *H04L 12/26* (2006.01)
(52) U.S. Cl.
   CPC .......... *H04L 43/0811* (2013.01); *H04L 61/303* (2013.01); *H04L 61/306* (2013.01)

(56) References Cited

U.S. PATENT DOCUMENTS

| | | | |
|---|---|---|---|
| 8,191,078 B1* | 5/2012 | Cullen | G06F 11/1443 707/610 |
| 2006/0036761 A1* | 2/2006 | Amra | H04L 67/2814 709/238 |
| 2006/0179147 A1* | 8/2006 | Tran | G06F 11/2012 709/227 |
| 2007/0150602 A1 | 6/2007 | Yared et al. | |
| 2008/0098255 A1* | 4/2008 | Tagane | G06F 11/1443 714/4.1 |
| 2008/0101345 A1* | 5/2008 | Suzuki | G06F 8/67 370/352 |
| 2010/0042715 A1* | 2/2010 | Tham | G06F 11/2025 709/224 |
| 2010/0091761 A1 | 4/2010 | Arnaud | |
| 2011/0055622 A1* | 3/2011 | Arai | G06F 11/2025 714/4.2 |
| 2013/0268617 A1 | 10/2013 | Erickson | |
| 2014/0019639 A1* | 1/2014 | Ueno | H04L 61/103 709/238 |
| 2014/0025986 A1 | 1/2014 | Kalyanaraman et al. | |
| 2014/0029740 A1 | 1/2014 | Middleswarth et al. | |
| 2014/0185429 A1* | 7/2014 | Takase | H04L 45/28 370/225 |
| 2015/0006948 A1* | 1/2015 | Yamabiraki | G06F 11/2002 714/4.11 |
| 2015/0032232 A1* | 1/2015 | Soldi | G05B 19/048 700/79 |

OTHER PUBLICATIONS

Jennings, C. et al. "Managing Client-Initiated Connections in the Session Initiation Protocol (SIP)," Network Working Group, Skype Labs, Oct. 2009, pp. 1-50.

* cited by examiner

RELIABILITY OF A CONNECTION DURING A COMMUNICATION SESSION ON A NETWORK DEVICE

CROSS REFERENCE TO RELATED APPLICATIONS

This application claims priority to and the benefit of U.S. Provisional Application No. 61/986,754 filed Apr. 30, 2014, entitled "Improving The Reliability of a Connection During a Communication Session on a Network Device." The entire contents of the foregoing application are hereby incorporated by reference in their entirety.

BACKGROUND

1. Technical Field

One or more embodiments disclosed herein relate generally to facilitating communications over a network. More specifically, one or more embodiments disclosed herein relate to improving the reliability of a connection during a communication session on an electronic communications device.

2. Background and Relevant Art

Advances in electronic communications technologies have interconnected people and allowed for better communication than ever before. To illustrate, users traditionally relied on a public switched telephone network ("PSTN") to speak with other users in real-time. Now, users may communicate using network or Internet-based communication systems. One such network-based system is an internet protocol ("IP") telephone system, such as a voice over IP ("VoIP") communication system.

Conventional VoIP systems commonly rely on a central datacenter/backup datacenter general architecture to provide VoIP services for each VoIP device. The central datacenter provides VoIP services such as facilitating VoIP communication sessions (e.g., voice and video calls). The backup datacenter generally provides an available option to restore the VoIP system to an operating state in the event the central datacenter fails (e.g., network failure, hardware failure, datacenter maintenance).

A number of disadvantages exist with respect to conventional VoIP systems. For example, conventional VoIP systems still greatly lag behind traditional PSTNs in terms of reliability, service, and dependability. For instance, traditional circuit-switched PSTNs have evolved over the last few decades to provide 99.95%-99.999% uptime. In contrast, conventional VoIP systems often are less reliable. For example, users often experience dropped calls, connection timeouts, service outages, and communication delays. Users experience frustration when attempting to access services that are unavailable, or when the VoIP system is not functioning as intended. Further, users experience frustration when the quality of a communication session fluctuates, or when a communication session terminates unexpectedly or prematurely.

When a communication session prematurely terminates, users must request that the VoIP system reinitiate the communication session. For example, if a user's VoIP phone call with a recipient user fails, the user must manually redial to allow the VoIP system to reconnect the user with the recipient user. Further, in some instances, the VoIP system may not immediately be able to reconnect the user with the recipient user, but must wait a period of time before being able to again establish communication with the recipient user due to one or more technical problems with the central datacenter or network connection with the central datacenter.

The central datacenter/backup datacenter model also may increase the possibility of system failure. For example, having a single datacenter for every network device increases the susceptibility to malicious attacks as a hacker wanting to disrupt a VoIP system need only to target the central datacenter. Similarly, accidents, such as a power failure, may cripple the VoIP system until the VoIP system provider can shift operations to the backup datacenter.

In conventional VoIP systems, if the central datacenter fails, the VoIP system is down until the central datacenter may be brought back online or until the services can be migrated to the backup datacenter. For example, customers on a call during an outage will experience a dropped call and often have to wait for service to be restored as the VoIP service provider shifts the VoIP system to the backup datacenter. In other words, while the backup datacenter provides a VoIP system an option to eventually restore service should the central datacenter fail, the backup datacenter does not prevent temporary service outages or dropped calls for users at the moment of failure.

Further, the backup datacenter does not provide support in the event that the network device temporary loses connection with the central datacenter. For example, if the connection between the network device and the central datacenter temporarily goes down, and a user's call is dropped, the backup datacenter provides no assistance.

Accordingly, there are a number of considerations to be made in improving the convenience, access, and systems associated with network-based communication systems.

BRIEF SUMMARY

Embodiments disclosed herein provide benefits and/or solve one or more of the foregoing or other problems in the art with systems and methods that facilitate fault tolerance (e.g., a dropped or disconnected communication session) during a communication session on a communications network. In particular, example embodiments disclosed herein disclose systems and methods that allow a network device to map to and register with multiple datacenters simultaneously. Mapping a network device to multiple datacenters simultaneously can improve the overall reliability and quality of the communications system.

In one or more example embodiments, a system can map the network device to multiple datacenters to prevent communication losses and to increase the reliability of a connection. For example, the system may cause a network device to map to and register with a primary datacenter. In addition, the system may also cause the network device to map to and register with a secondary datacenter. If a problem or fault develops with the primary connection between the network device and the primary datacenter, the network device may utilize the secondary connection between the network device and the secondary datacenter. Similarly, if a fault develops on the secondary connection while the network device is utilizing the secondary connection with the second datacenter, the network device may utilize the primary connection with the primary datacenter.

Additional features and advantages disclosed herein will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the present disclosure can be obtained, a more particular description of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings in which.

DETAILED DESCRIPTION

Figure 1:
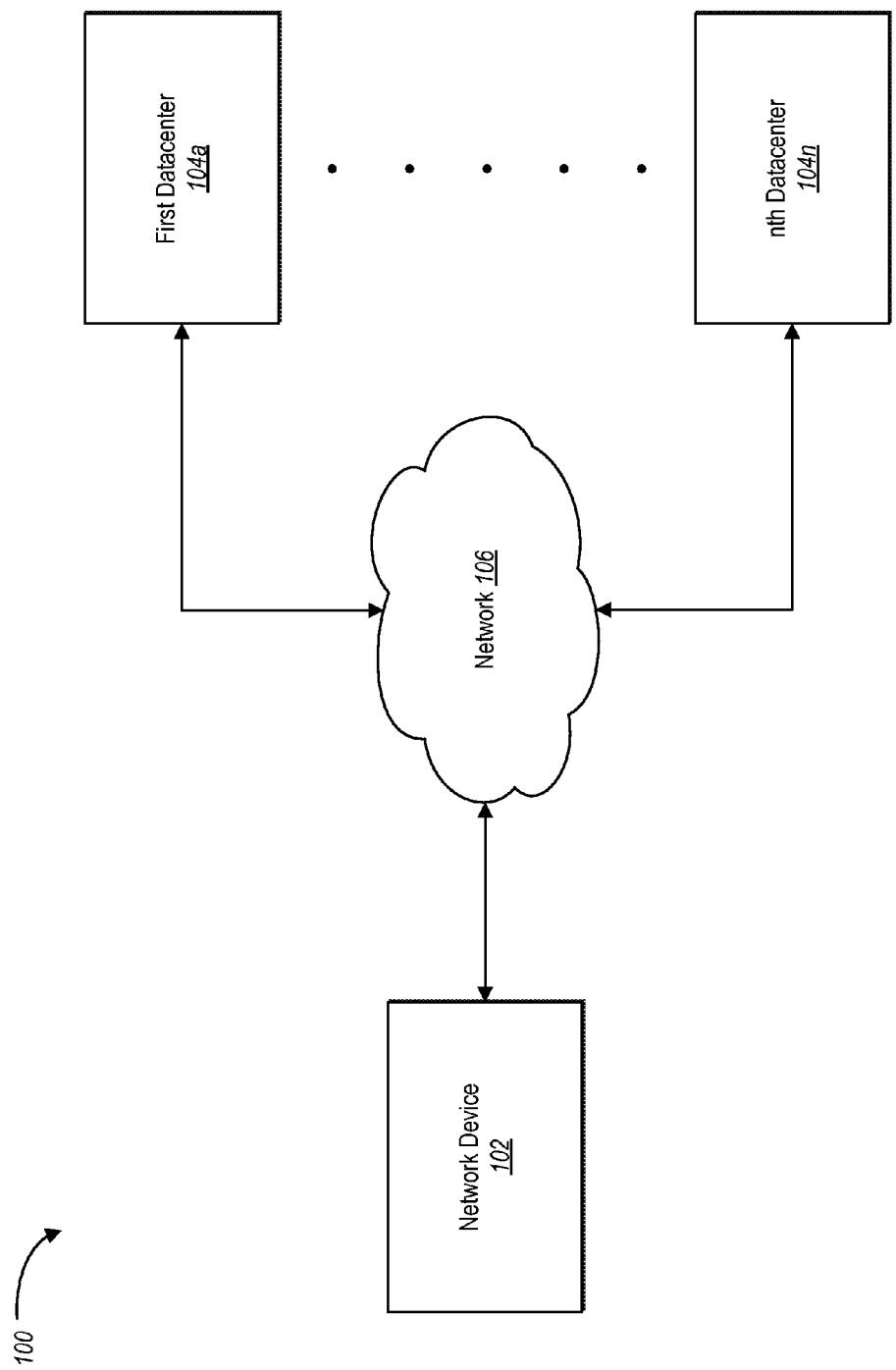
FIG. 1 illustrates a network-based communications system in accordance with one or more embodiments disclosed herein.

Embodiments disclosed herein provide benefits and/or solve one or more of the abovementioned problems or other problems in the art with improving user communication in a network-based communication system. In particular, one or more example embodiments include a system that allows a network device to jointly map to and register with multiple datacenters. Thus, unlike conventional Internet Protocol ("IP") communication systems described above, where a network device is statically associated with a single datacenter, embodiments herein disclose a system that allows a network device to connect with a primary datacenter and participate in a communication session via the primary datacenter while jointly being connected with a secondary datacenter.

For example, the system can include a network device that is mapped to both a primary datacenter and a secondary datacenter. The system can register the network device with the primary datacenter to establish a primary datacenter connection. The system can also register the network device with a secondary datacenter to establish a secondary connection, while also maintaining the primary connection. Thus, the system may facilitate the network device connecting with multiple datacenters simultaneously.

Mapping to multiple datacenters simultaneously provides increased fault tolerance to users participating in communication sessions. For example, when a first user requests to contact a second user, the system prepares a media bridge connection between the network device and a second network device. For instance, the system may have a primary datacenter prepare a primary media bridge connection. The system may also have a secondary datacenter prepare a secondary media bridge connection. The network device may use the primary media bridge connection to initiate a communication session with the second user.

During the communication session the system may monitor the primary media bridge connection for faults and quality fluctuations. The system may detect a fault in the primary media bridge connection or a drop in the connection quality. For instance, when a fault is detected, the system may switch the network device from the primary media bridge connection to the secondary media bridge prepared by the secondary datacenter. In this manner, if the primary media bridge connection fails, loses quality, or if a connection loss occurs between the network device and the primary datacenter, the system may seamlessly transfer the communication session to the secondary media bridge connection without detection from either user.

In addition, by mapping a network device to multiple datacenters simultaneously, one or more embodiments disclosed herein can improve network-based communication systems by ensuring connection reliability between network devices and between datacenters. For example, if a network device is mapped to two datacenters and a connection with one of the two datacenters fails, the network device may utilize the connection with the secondary datacenter without suffering loss, delay, or requiring additional user interaction. In particular, in one or more embodiments, the user is unaware of the primary connection's fault because the network device seamlessly continues the communication session using the secondary connection.

In one or more embodiments, the system may remap the network device to different datacenters. For example, if the network device is mapped to two datacenters and the connection with the primary datacenter fails, the system may remap the failed connection to a different datacenter, such as a third datacenter. Meanwhile, while remapping the failed connection to the third datacenter, the system continues to provide communication services to the user via the secondary datacenter, with which the network device is still connected.

In some example embodiments, the system may dynamically remap the network device to datacenters based on network changes. For example, the system can monitor connection factors, identify network characteristics between the network device and multiple datacenters. Based on the network characteristics, the system can determine the quality of available connections between the network device and each datacenter. As the system analyzes and determines the optimal available datacenter connection, the system may remap the network device to the optimal datacenters.

In particular, the system can analyze the network characteristics to determine a connectivity metric for each available connection associated with each data center. The system can use the connectivity metric for each connection to determine an optimal connection (e.g., the fastest, most stable, highest quality connection) available to the network device. Furthermore, the system can cause the network device to remap to a different datacenter based on determining the optimal connection. In some instances, the network device may perform the steps of monitoring connection factors, identifying network characteristics, analyzing the network characteristics, and determining the connectivity metrics.

Accordingly, the system and methods herein provide the benefit of increasing the reliability of a connection to users participating in communication sessions. Further, the system and methods disclosed herein increase the reliability and uptime of a network-based communication system. Specifically, in the event that a primary connection between a network device and the datacenter to which the network device is mapped fails, the secondary connection with a secondary datacenter may seamlessly provide services to the user. Transitioning between datacenters to which the network device is mapped may also seamlessly occur during a communication session.

Additional advantages and benefits of the system will become apparent in view of the below description. In particular, one or more embodiments of the system will be described below with reference to one or more figures. In addition, the following definitions of terms will be used to describe one or more features of the system.

As used herein, the term "datacenter" refers generally to one or more computing devices that facilitate communication sessions between network devices. In one or more embodiments, a datacenter refers to a facility that houses computer systems and associated components, such as telecommunications and storage systems. For example, one of skill on the art will appreciate that a datacenter may comprise a single computing device that facilitates communication between two or more network devices, or that a datacenter may comprise a building housing computers, servers, and other components facilitating communication for thousands of network devices. Further, a datacenter may be an outbound proxy.

In addition, the terms "device," "network device," or "VoIP device" as used herein refer generally to a computing device that facilitates a communication session. A network device can communicate with a datacenter and network with other network devices. A variety of network devices may employ VoIP technology, such as personal computers, handheld devices, mobile phones, smartphones, and other electronic access devices. As an example, a network device may be a dedicated VoIP device or soft VoIP device. Dedicated and soft devices are described in greater detail below in connection with FIGS. 8-9.

As used herein, the terms "session," "communication session," or "multimedia communication session" refers generally to a communication interaction between one or more network devices that occurs over an IP network. For example a communication session may include voice or video calling, video conferencing, streaming multimedia distribution, instant messaging, presence information sharing, file transferring, faxing over IP, and online gaming. For instance, a session may be part of the session initiation protocol ("SIP"), which is a signaling communications protocol commonly used in network-based communication systems. Likewise, a session may refer to a communication session using other protocols common to IP peer communications.

The term "media bridge," as used herein, generally refers to a connection between two devices that allows media, such as audio and video communications, to transfer from one network device to one or more other network devices. For example, a media bridge may allow a first network device to send voice and video data to a second network device during a communication session. In general, upon the network device's request to participate in a communication session, a datacenter prepares a media bridge connection and presents the media bridge connection to the network device. The network device may then employ the media bridge connection for the communication session. In addition, during the communication session, the datacenter may monitor the connection quality and status of the media bridge connection.

As used herein, the terms "connection" and "network connection" refer generally to an established communication link between at least two computing devices. For instance, two or more network devices connect to, or with, each other when each network device acknowledges the connection with the other network device(s). For example, as further described below, a connection between a network device and a datacenter may occur when the network device is mapped to and registers with the datacenter. A connection can include one or more types of connections, such as a switched circuit connection, a virtual circuit connection, or a network connection. For example, a network connection between multiple network devices occurs over a network, such as the Internet, and data sent between the multiple network devices via the network connection may employ various network paths. Further, a connection may include a media bridge connection, including a connection between two network devices via a media bridge.

The term "available connection" as used herein generally refers to a potential connection for a network device. For example, a network device may have one or more available connections with one or more datacenters. Upon establishing a communication link, an available connection may become a connection. Other examples of available connections may include an available datacenter connection and an available media bridge connection.

As used herein, the term "connection factor(s)" generally refers to properties of a network. In general, a connection factor refers to a network property that may be monitored, measured, and/or reported. For example, a network device may measure one or more connection factors for a connection, or an available connection, between the network device and a datacenter. For instance, the network device may measure one or more of the following connection factors for an available connection between the network device and the datacenter, including, but not limited to, the quality of the network connection, the reliability of the communication path, the response time, the amount of network traffic, the number of retransmissions, the number of dropped packets, the geographic distance, and the number of hops between the two network devices.

The term "network characteristic" refers generally to an identifiable value or data type associated with a connection factor. For example, a network characteristic may be a value representing a current state of a connection factor. For instance, if a connection factor measures the number of hops between two network devices for a connection or available connection, the network characteristic may be the reported number of hops between the two network devices.

The term "connectivity metric," as used herein, generally refers to a result determined from performing an analysis on one or more network characteristics. In particular, a connectivity metric may be the result of analyzing one or more network characteristics. For example, a network device may employ an algorithm that analyzes multiple network characteristics to determine a connectivity metric. Connectivity metrics may be compared, rated, or ranked with each other. Comparing, rating, or ranking connectivity metrics for available networks may determine the optimal available connection. In addition, the system may compare a connection to an available connection by comparing their respective connectivity metrics to each other.

Although the disclosure discusses one or more example embodiments in reference to VoIP telephone network-based systems, it should be understood that the principles, systems, and methods disclosed herein may also be effectively used in other types of packet-based IP communication networks and unified (e.g., real-time) communication systems. For instance, the principles described may be used for sending faxes, text messages, and voice-messages over a network-based communication system.

FIG. 1, for example, illustrates a network-based communications system 100 (or simply "system 100") in accordance with one or more embodiments disclosed herein. An overview of the system 100 will be described next in relation to FIG. 1. Thereafter, a more detailed description of the components and processes of the system 100 will be described in relation to the remaining figures.

As illustrated by FIG. 1, the system 100 may include, but is not limited to, a network device 102, a primary datacenter 104a, and an nth datacenter 104n (collectively referred to as "datacenters 104"). The system 100 may also include multiple network devices. For example, the system 100 may include almost any number of network devices 102 and/or datacenters 104.

The network device 102 and the datacenters 104 are communicatively coupled via a network 106. In some example embodiments, the network 106 may be the Internet, an intranet, a private network, or another type of computer network. The network 106 may be a combination of Internet and intranet networks. Additional details regarding the network 106 will be discussed below with respect to FIG. 8.

As will be explained in greater detail below, the network device 102 can map to and register with one or more datacenters 104. For example, the network device 102 can jointly map to both the primary datacenter 104a and the nth datacenter 104n. When the network device 102 jointly maps to two datacenters 104, the system 100 may increase the reliability of a connection during a communication session, as will be explained further below.

Figure 2:
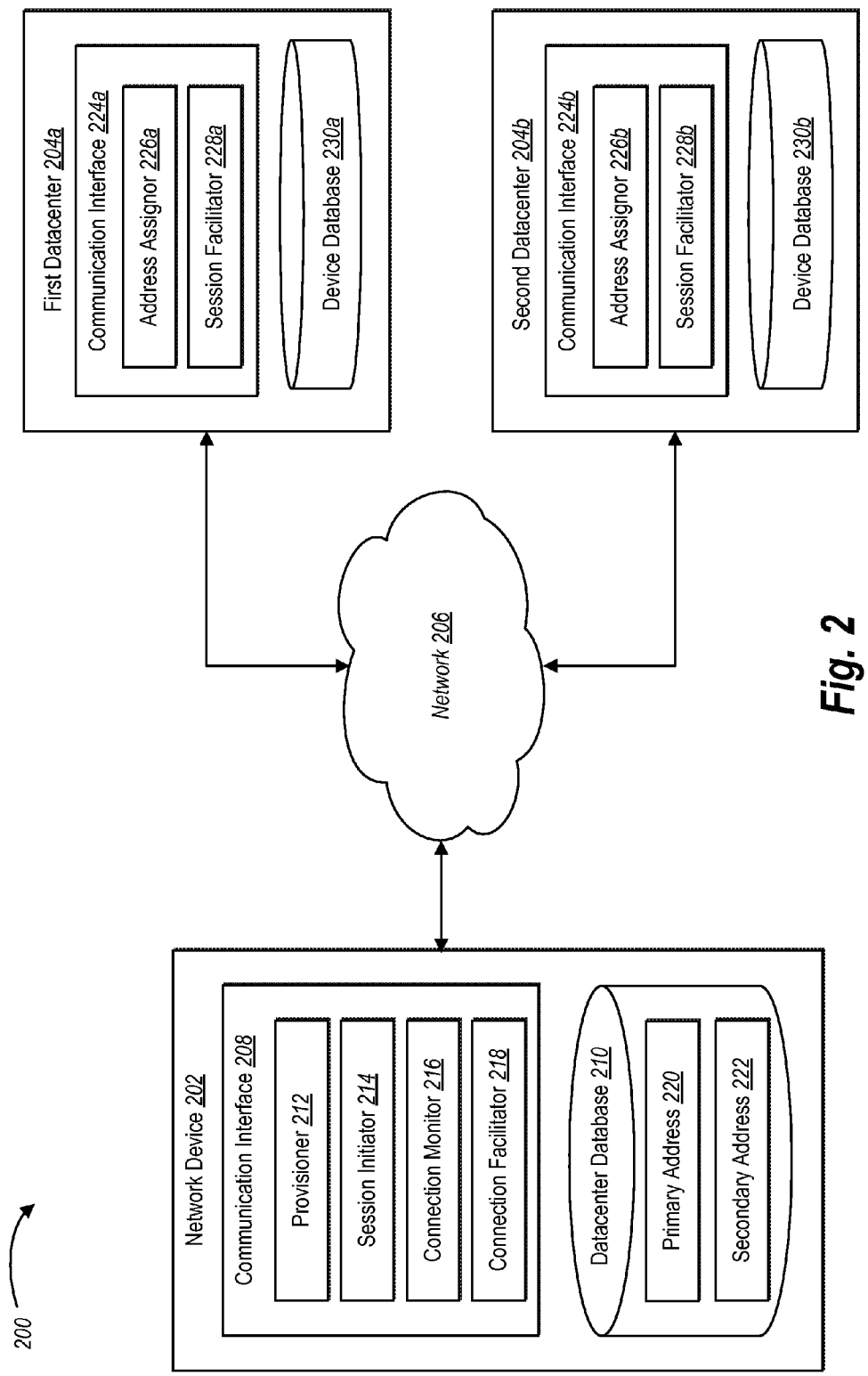
FIG. 2 illustrates a network-based VoIP communication system in accordance with one or more embodiments disclosed herein.

FIG. 2 illustrates an exemplary network-based VoIP communication system 200 (hereafter "VoIP system 200") according to principles described herein. For example, the VoIP system 200 may represent one or more embodiments of the system 100 described in connection with FIG. 1. For instance, the network device 202 may be one example embodiment of the network device 102. Likewise, the primary datacenter 204a and the secondary datacenter 204b may be example embodiments of the datacenters 104a-n described in connection with FIG. 1.

As illustrated, the VoIP system 200 includes a network device 202, a primary datacenter 204a, and a secondary datacenter 204b. VoIP system 200 is described as having a primary datacenter 204a and a secondary datacenter 204b (collectively "datacenters 204") for ease of explanation. However, the principles described with respect to FIG. 2 can be implemented within a VoIP system 200 having any number of network devices 202 and datacenters 204a, 204b. The network device 202 may connect to the datacenters 204 via the Internet 206. In some example embodiments, the network device 202 may be directly connected to one or more datacenters 204. In addition, the network device 202 may securely connect to a datacenter 204 via a secure connection, for example, using secure sockets layer ("SSL") protocol, or another cryptographic protocol.

In some example embodiments, the network device 202 may be a VoIP device. The network device 202 may allow a user to communicate with other users. For instance, the network device 202 may facilitate voice and/or data communication sessions between users. The network device 202 may also allow a user to modify preferences and/or access voice-messages, each of which may be stored at one or more the datacenters 204. In addition, as described above, users may communicate with other users using other forms of communication provided by network device 202, such as a videoconference.

The network device 202 includes a communication interface 208 and a datacenter database 210. The network device 202 may also include input and output audio/video functionality as described below in connection with FIG. 8. For example, as described in greater detail below, the network device 202 may be a dedicated device, or a soft device, such as a dedicated VoIP device.

The network device 202 can employ the communication interface 208 to send and receive data. For example, the communication interface 208 may send or receive queries, requests, acknowledgements, signals, indications, etc., between the network device 202 and one or more datacenters 204. For example, the communication interface 208 may map, negotiate, establish, monitor, analyze, and navigate communications between the network device 202 and multiple datacenters 204.

As illustrated, the communication interface 208 may include a provisioner 212, a session initiator 214, a connection monitor 216, and a connection facilitator 218. In general, the provisioner 212 maps and registers the network device 202 to one or more datacenters 204. The session initiator 214 facilitates communications between users via the network device 202. The connection monitor 216 monitors connections corresponding to each connected datacenter 204. The connection facilitator 218 assists the network device 202 in switching between connections when the network device 202 is connected to multiple datacenters 204. Additional detail regarding each component of the communication interface 208 is discussed in greater detail below.

Each of the components 212-218 of VoIP system 200 may be in communication with one another using any suitable communication technologies. It will be recognized that although components 212-218 are shown to be separate in FIG. 2, any of components 212-218 may be combined into fewer components, such as into a single component, or divided into more components as may serve a particular embodiment. In addition, components 212-218 may be located on, or implemented by, one or more network devices, such as those described below in relation to FIG. 8. Alternatively, components 212-218, or portions of components 212-218 can be located on one or more databases 204.

Components 212-218 can comprise software, hardware, or both. For example, components 212-218 can comprise one or more instructions stored on a computer-readable storage medium and executable by processors of one or more computing devices. When executed by the one or more processors, the computer-executable instructions of VoIP system 200 can cause a network device and/or datacenter to perform the methods described herein. Alternatively, components 212-218 can comprise hardware, such as a special purpose processing device to perform a certain function or group of functions. Additionally or alternatively, components 212-218 can comprise a combination of computer-executable instructions and hardware.

In particular, for example, the session initiator 214 may be a separate module on the network device 202. In addition, one or more of the above listed components included in the communication interface 208 may be located outside of the network device 202. For example, in some example embodiments, the connection monitor 216 may be located on a remote computing device or even at a datacenter 204. For instance, in one or more embodiment, the datacenter 204 may monitor the media bridge connection between two network devices and inform one or both of the network devices when the media bridge connection weakens or fails.

As briefly described above, the provisioner 212 maps and registers the network device 202 with one or more datacenters 204. For example, the provisioner 212 maps the network device 202 to the primary datacenter 204a. While maintaining the mapping to the primary datacenter 204a, the provisioner 212 may also map the network device 202 to the secondary datacenter 204b. In response, the primary datacenter 204a and the secondary datacenter 204b may independently register the network device 202.

In some example embodiments, the network device 202 may initially map to a specific datacenter 204. For example, the network device 202 may have one or more datacenter 204 addresses stored in memory by default, such as in the datacenter database 210. For instance, the primary datacenter 204a may connect to the primary datacenter 204a because the primary datacenter 204a is initially stored as the primary address 220 in the datacenter database 210. In this manner, the network device 202 may map to and be recognized with the VoIP system 200 before mapping to different and/or additional datacenters 204. In some example embodiments, both the primary address 220 and the secondary address 222 may be initially set before the user initially powers on the network device 202.

In one or more embodiments, the network device 202 may obtain a list of multiple datacenters 204 with which to potentially connect. For example, the network device 202 may initially contact a host at specific address, such as domain.com, to obtain a list of one or more datacenters. For instance, the network device 202 may obtain a hostname or an address of the VoIP system 200 from the manufacture of the network device 202 when the network device 202 is first powered on. The network device 202 may receive a list of one, two, or more datacenter addresses from the host. In some instances, the network device 202 may rank the list of available datacenter connections. For example, a network analyzer on the network device 202 may monitor and analyze the available datacenter connections with each datacenter 204 and order the list of datacenters 204 based on which datacenters 204 offer the optimal available datacenter connection, etc.

The network device 202 may select one or more datacenters 204 and map to the one or more selected datacenters 204. For example, the network device 202 may select a datacenter 204 to map to from the list of available datacenter connections. For instance, the network device 202 may select a datacenter 204 to serve as the primary datacenter based on connectivity metrics associated with the datacenter connections, selected randomly, alternately selected, or selected using another method or approach. Additionally or alternatively, the network device 202 may select the datacenter 204 that is geographically closest as the primary datacenter.

In some example embodiments, mapping may include the provisioner 212 looking up data associated with the one or more selected datacenters 204, and using the data to connect to the selected datacenters 204. For example, the provisioner 212 may lookup the IP address of the secondary datacenter 204b and configure or set the outgoing address of the network device 202 to the IP address of the secondary datacenter 204b. Alternatively, the provisioner 212 may send out a broadcast, such as an anycast DNS (domain name service) to obtain the IP address of the secondary datacenter 204b. The IP address of each datacenter 204 may represent an outbound proxy.

In addition to mapping the network device 202 with one or more datacenters 204, the provisioner 212 may also allow the network device 202 to register with each datacenter 204 to which the network device 202 is mapped. Registering may include the datacenter 204 assigning an address to the network device 202. Additional detail regarding assigning addresses is described below.

In some example embodiments, the network device 202 may register with multiple datacenters 204. For example, the provisioner 212 can map the network device 202 to the primary datacenter 204a. In addition, after mapping the network device 202 to the primary datacenter 204a, the provisioner 212 may request to connect and register with the primary datacenter 204a. In response to the request, for example, the provisioner 212 may receive an address from the primary datacenter 204a. The provisioner 212 may also map the network device to the secondary datacenter 204b, while maintaining the connection with the primary datacenter 204a. For example, the provisioner 212 may request to connect and register with the secondary datacenter 204b, including requesting and receiving an address from the secondary datacenter 204b.

In one or more embodiments, the provisioner 212 may jointly map to and connect with multiple datacenters 204. For example, the provisioner 212 may send requests to both the primary datacenter 204a and the secondary datacenter 204b. For instance, the provisioner 212 may request an address from both the primary datacenter 204a and the secondary datacenter 204b in parallel requests or subsequent requests.

In alternate embodiments, the provisioner 212 may map to and/or register with multiple datacenters 204 sequentially. For example, the provisioner 212 may first map to the primary datacenter 204a and ensure a connection with the primary datacenter 204a before mapping to the secondary datacenter 204b. As another example, the provisioner 212 may map to both the primary datacenter 204a and the secondary datacenter 204b, but the provisioner 212 may register with the primary datacenter 204a before requesting to register with the secondary datacenter 204b. In some instances, the provisioner 212 may establish a connection with the each datacenter 204 using a signaling protocol, such as SIP.

Each datacenter 204 may respond to the request by issuing an identification number or address to the network device 202. In one or more embodiments, the identification number may be unique to the network device 202. For example, the identification number may be tied to the MAC (media access control) address of the network device 202. Alternatively, the identification number may include a phone number assigned to the network device 202. In one or more embodiments, the address may include the unique identification number. This address allows the network device 202 to be contacted by other devices on the VoIP system 200. In some instances, the address may be in the form of <unique identification number>@domain.net.

The provisioner 212 may receive and store the address assigned from a datacenter 204. For example, the network device 202 maps to the primary datacenter 204a, connects with the primary datacenter 204a, and then receives an address from the primary datacenter 204a (e.g., registers with the primary datacenter 204a). The network device 202 may store the received address in the datacenter database 210 on the network device 202.

The network device 202 may store the received address as either a first or primary address 220, or a second or secondary address 222. For example, if the network device is not currently mapped to any datacenter 204 and the network device 202 subsequently maps to the primary datacenter 204a, the network device 202 may store the address received from the primary datacenter 204a as the primary address 220. If the network device 202 later maps to, connects with, and receives an address from the secondary datacenter 204b, the network device 202 may store the address received from the secondary datacenter 204b as the secondary address 222. In some example embodiments, the network device 202 may store additional addresses in the datacenter database 210. For instance, the datacenter database 210 may store any number of addresses received from datacenters 204 to which the network device 202 is connected and/or registered.

In one or more embodiments, the network device 202 may prioritize datacenter connections based on the primary address 220 and the secondary address 222. For example, the network device 202 may prioritize the connection associated with the primary address 220 as the primary connection, and the connection associated with the secondary address 222 as the secondary connection. The network device 202 may first employ the primary connection when communicating with devices on the VoIP system 200. If the primary connection becomes unavailable, then the network device 202 may employ the secondary connection.

For convenience, in general the systems and methods disclosed herein will be described in terms of a primary datacenter connection and a secondary datacenter connection, where the primary datacenter connection has priority over the secondary datacenter connection. However, in some example embodiments, the network device 202 may utilize the primary datacenter connection and secondary datacenter connection equally. For example, the network device 202 may alternate between using the primary datacenter connection and the secondary datacenter connection. In yet other example embodiments, the network device 202 may prioritize the secondary connection over the primary connection.

In one or more embodiments, the network device 202 may communicate with both the primary datacenter 204a and the secondary datacenter 204b concurrently. For instance, the network device 202 may send and receive duplicate data from each datacenter 204. For example, the network device 202 may ensure backup redundancy protection by receiving multiple copies of real-time data sent in a communication session, for example, one copy over each datacenter connection. By receiving duplicate data, the network device 202 may improve the connection quality of a communication session. For example, the network device 202 may compare the two copies of received data to prevent transmission errors. For instance, the network device 202 may use packets from one connection when packets from the other connection are unexpectedly dropped. As yet another example, the network device 202 may analyze the two copies of received data to determine which connection is superior, and based on the determination, use the received data associated with the superior connection as the primary source for sending and receiving communication session data.

In another instance, the network device 202 may send and receive portions of related data from each datacenter 204. For example, the network device 202 may send data using the primary datacenter connection and receive data using the secondary datacenter connection, or vise versa. In yet another instance, the network device 202 may use both the primary datacenter connection and the secondary datacenter connection at the same time, but send and receive independent communications between the datacenters 204. For example, the primary datacenter connection may be used for communication sessions, while the secondary datacenter connection is used to retrieve user preferences and settings.

As mentioned above, the primary datacenter connection can have priority over the secondary datacenter connection. For example, the network device 202 can store the address received from the primary datacenter 204a as the primary address 200 and the address received from the secondary datacenter 204b as the secondary address, thus prioritizing the primary datacenter 204a over the secondary datacenter 204b. In other words, the network device 202 may first communicate with the primary datacenter 204a when accessing system-provided services, such as participating in communication sessions, accessing user preferences stored on the system, and retrieving message data. In the event that the connection with the primary datacenter 204a weakens or fails, the network device 202 may seamlessly switch communications to the secondary datacenter 204b when accessing system-provided services. Additional detail regarding monitoring and switching between datacenter connections will be given below.

In one or more VoIP system 200 embodiments, the provisioning process may be in accordance with session protocol, such as SIP. SIP communications exhibit a SIP uniform resource identifier ("URI" or "SIP URI") that identifies each participant of a SIP session. In one embodiment, the SIP URI comprises a username and a domain in the form of user@domain. Further, the identifier "SIP" may precede the SIP address to indicate that the communication is a SIP communication. For instance, the SIP URI may take the form of SIP:user@domain.net or SIP:user@domain.net:port. In addition, the SIP URI may include a globally-routable domain. For example, a first network device 202 is registered with SIP URI userA@domain.com, while a second network device 202 is registered with the SIP URI userB@domain.com. In some example embodiments, a SIP URI may be registered with multiple network devices 202.

In some example embodiments, the provisioner 212 may also change connections between datacenters 204. For example, the network device 202 may be connected to the primary datacenter 204a and the secondary datacenter 204b. The provisioner 212 may instruct the network device 202 to connect to a third datacenter (not illustrated). The provisioner 212 may replace one of the currently mapped datacenters with the third datacenter. For example, the provisioner 212 may replace the primary datacenter 204a with the third datacenter.

In particular, the network device 202 may remap to various datacenters 204 based on network conditions and characteristics. For example, in some example embodiments, the network device 202 may monitor connection factors for each datacenter connection and available datacenter connections. For example, the network device 202 may map to and connect with the primary datacenter 204*a* and the secondary datacenter 204*b*. In this case, the network device 202 may monitor connection factors for the primary datacenter 204*a* connection and the secondary datacenter 204*b* connection. The network device 202 may also monitor connection factors for available datacenter connections, such as a potential connection to a third datacenter.

Based on monitoring the various connection factors, the network device 202 may determine one or more network characteristics that represent the current status or state of one or more corresponding connection factors. The network device 202 can analyze the network characteristics to determine a connectivity metric for each monitored datacenter connection and available datacenter connection. The network device 202 may use the connectivity metrics for each connection/available connection to determine an optimal available connection (e.g., fastest, most stable, highest quality). The network device 202 may rank or order the datacenters 204 based on a comparison of the connectivity metrics. In some instances, monitoring connection factors, identifying network characteristics, analyzing the network characteristics, and determining the connectivity metrics may be performed by one or more datacenters 204, or by a different electronic device located on the VoIP system 200.

As described above, the network device 202 may remap to one or more different datacenters 204. Remapping may be the result of which datacenter 204 currently has the optimal connection to the network device 202. For example, if the network device 202 is mapped to the primary datacenter 204*a* and the secondary datacenter 204*b*, and the network device 202 detects that a third datacenter provides a superior connection than the primary datacenter 204*a* connection and the secondary datacenter 204*b* connection, the network device 202 may replace the mapping of either the primary datacenter 204*a* or the secondary datacenter 204*b* with a mapping to the third datacenter.

In some example embodiments, the network device 202 may determine which current mapping to replace based on the connectivity metric associated with each datacenter connection. For example, the available connection with the third datacenter may have the highest connectivity metric, the current connection with the primary datacenter 204*a* may have the second highest connectivity metric, and the current connection with the secondary datacenter 204*b* may have the third highest connectivity metric. In this case, the network device 202 may drop the mapping with the secondary datacenter 204*b* and map to the third datacenter.

Further, as described above in more detail, connection priority may be based on connectivity metrics associated with each datacenter connection. For example, the datacenter 204 having the optimal connection metric may be set as the primary connection. The datacenter 204 with the next optimal connection metric may be set as the secondary connection. Thus, applying the above example, the connection with the third datacenter may be set as the primary connection. The connection with the primary datacenter 204*a* may be moved from the primary connection to the secondary connection.

While the systems and methods herein disclose that a network device 202 jointly maps to and registers with two datacenters 204, the network device 202 may jointly map to and register with any number of datacenters 204. For example, the provisioner 212 may jointly map to and register with three or four datacenters 204. In this manner, the systems and methods disclosed herein provide a user with a continuous connection to the VoIP system 200 by providing concurrent connections to multiple datacenters 204, and in the event that the connection with one datacenter 204 fails, one or more alternate datacenter connections maintain the user's connectivity to the VoIP system 200, as well as provide fault tolerances during communication sessions.

In one or more embodiments, before provisioning occurs, the provisioner 212 verifies that a number of provisioning conditions are satisfied. Provisioning conditions may include satisfying a threshold value, compliance to applicable regulations and laws, etc. For example, the provisioner 212 may verify that a threshold value has been satisfied before replacing a current mapping with a connected datacenter 204 with a potential mapping to a non-connected datacenter 204. For example, when the provisioner 212 receives an indication that an available datacenter connection provides a superior connection to one or more current datacenter connections, the provisioner 212 may also receive the connectivity metric for the one or more current datacenter connections and the available datacenter connection. The provisioner 212 may compare the connectivity metrics to determine if the difference between the connectivity metrics satisfies a threshold value. In these embodiments, requiring that the threshold value be satisfied prevents the network device 202 from constantly alternating between two or more datacenters 204 that have similar connectivity metrics. In some example embodiments, depending on the particular application, however, it may be desirable to not incorporate a threshold, or set a threshold at a value of 0.

The provisioner 212 may also verify compliance with telecommunication laws and regulations, both national and international. For example, a network device 202 in London may want to map to and register with a datacenter 204, located in New York. However, an international regulation may restrict communications from entering in the United States. In this case, the provisioner 212 maps to an alternate datacenter 204. The provisioner 212 again verifies that connecting to the alternate datacenter 204 complies with applicable laws and regulations. For example, the provisioner 212 may perform a table lookup to verify that the network device 202 is authorized to connect to a datacenter 204 located in a specific country, area, or region. In addition, the lookup table may be updated to reflect changes in regulations and laws.

In addition, the provisioner 212 may replace mappings with a datacenter 204 when a fault develops with a currently connected datacenter 204. Likewise, the provisioner 212 may remap to a different datacenter when network characteristics associated with one or more currently connected datacenters 204 weaken. For example, the network device 202 may be mapped to the primary datacenter 204*a* and the secondary datacenter 204*b*. An error or fault may occur in the datacenter connection with the primary datacenter 204*a*. The provisioner 212 may drop the mapping with the primary datacenter 204*a* and remap to another available datacenter 204. While replacing the mapping with the primary datacenter 204*a*, the network device 202 may utilize the connection with the secondary datacenter 204*b* for any communication needs.

As briefly described above, the session initiator 214 facilitates communications between users via the network device 202. For example, the session initiator 214 may initiate audio, video, and other types of media in a communication sessions between users. The session initiator 214 may employ protocol, such as SIP, in facilitating communication sessions between users and setting up a media bridge with another network device.

In particular, the session initiator 214 may communicate with a datacenter 204 to initiate a communication session. In one or more embodiments, the session initiator 214 may communicate with the datacenter 204 associated with the primary address 220/primary connection. The session initiator 214 may also communicate with the datacenter 204 associated with the secondary address 222/secondary connection.

In some example embodiments, the session initiator 214 may first communicate with the primary datacenter. For example, the session initiator 214 may request the primary datacenter provide a media bridge connection between the network device 202 and a second network device (hereafter "primary media bridge connection"). Upon receiving the primary media bridge connection from the primary datacenter, the session initiator 214 may then request a secondary media bridge connection from the secondary datacenter (hereafter "secondary media bridge connection"). The session initiator 214 may use the secondary media bridge connection in the event that the primary media bridge connection fails.

While the primary media bridge connection and the secondary media bridge connection can provide a connection between the network device 202 and a second network device, in general, the primary media bridge connection and the secondary media bridge connection do not employ the same network path. Additional detail regarding media bridge connection paths will be given below in connection with FIG. 5.

In some example embodiments, the session initiator 214 may concurrently communicate with both the primary datacenter 204a and the secondary datacenter 204b. For instance, the session initiator 214 may request a media bridge connection from both the primary datacenter 204a and the secondary datacenter 204b. For example, while the session initiator 214 requests a media bridge connection from both the primary datacenter 204a and the secondary datacenter 204b, the session initiator 214, by default, employs the primary media bridge connection for a communication session and holds the secondary media bridge connection in reserve.

As another example, the session initiator 214 may request media bridge connections from both the primary datacenter 204a and the secondary datacenter 204b. Then, the session initiator 214 employs the media bridge connection first returned to the session initiator 214 to facilitate a communication session between network devices. As yet another example, the session initiator 214 may receive the primary media bridge connection and the secondary media bridge connection. The session initiator 214 may then determine which media bridge connection to employ based one or more factors, such as connection factors.

In one or more embodiments, the session initiator 214 requests the secondary media bridge connection from the secondary datacenter 204b upon detecting a fault or a decrease in connection quality in the primary media bridge connection. As described below, the connection monitor 216 may communicate with the session initiator 214 to notify the session initiator 214 when the connection quality of the primary media bridge connection begins to weaken. Upon receiving the notification, the session initiator 214 may request the secondary media bridge connection from the secondary datacenter 204b.

During a communication session, the connection monitor 216 may monitor for faults in the primary media bridge connection (e.g., the active media bridge connection). For example, if the session initiator 214 has initialized a communication session over the primary media bridge connection, the connection monitor 216 may monitor the primary media bridge connection for the occurrence of a fault, or a break in the communication session.

The connection monitor 216 may also monitor for deteriorating conditions in the connection, such as a drop in connection quality. For example, the connection monitor 216 may detect if the quality of the primary media bridge connection drops below a threshold value. For instance, the threshold value may be defined in terms of connection factors or network characteristics. The threshold value may be compared to the original quality level of the primary media bridge connection, or may be relative to the current quality level of another connection, such as the secondary media bridge connection.

If a fault is detected, or if the quality drops, the connection facilitator 218 may facilitate a switch in the media bridge connection. In particular, the connection facilitator 218 may switch the communication session from the primary media bridge connection to the secondary media bridge connection. In this manner, the integrity of the communication session is preserved even in the event of a media bridge connection fault or quality loss. In one or more embodiments, the connection facilitator 218 may switch media bridge connections even when no fault is detected or when quality remains constant. As described above, in some instances, the connection facilitator 218 may notify the session initiator 214 to request a secondary media bridge connection upon detecting a fault or a weakened connection in the primary media bridge connection.

As an illustrative example of the systems and methods disclosed herein, a user may request to contact a second user. The user may be associated with the network device 202 and the second user may be associated with a second network device. The session initiator 214 associated with the network device 202 may request a communication session between the two users to the primary datacenter 204a and the secondary datacenter 204b. Each datacenter 204a, 204b may provide the session initiator 214 with a media bridge connection. The session initiator 214 may employ the primary media bridge connection and maintain the secondary media bridge connection as a backup or fallback.

During the communication session, the connection monitor 216 may detect a fault in the primary media bridge connection. At the moment of fault detection, the connection facilitator 218 may switch the communication session to the secondary media bridge connection. As briefly described above, the connection facilitator 218 may switch to the secondary media bridge connection before a fault occurs on the primary media bridge connection. In particular, the connection monitor 216 may detect indications of a weakening connection, such as a drop in connection quality or an increase in the number of dropped packets. Accordingly, the transition is such that neither the first user nor the second user detects the changeover. In some instances, the process of detecting a connection loss, and establishing a connection with the secondary media bridge connection may occur as quickly as 100 ms, and generally, in less than a second.

Returning to FIG. 2, the VoIP system 200 includes the primary datacenter 204a and the secondary datacenter 204b. As shown, each datacenter 204 has a communication interface 224, which further includes an address assignor 226 and a session facilitator 228, and a device database 230. The communication interface 224 may communicate with the communication interface 208 located on the network device

202. For example, as described above, the provisioner 212 may request to connect with one or more datacenters 204, such as the primary datacenter 204*a*.

In response, the primary datacenter address assignor 226*a* on the primary datacenter 204*a* may assign a device address to the network device 202. The assigned address may also be stored in the primary datacenter device database 230*a*. In general, the device database 230 may store connection information associated with the network device 202, such as a phone number that reaches the network device 202.

In some instances, the address given to the network device 202 by the address assignor 226 may be datacenter 204 specific. Thus, the address assigned by the primary datacenter 204*a* may be different from an address assigned from the secondary datacenter 204*b*. For example, the address may be the identification number of the network device 202, followed by an indication of which datacenter is assigning the address, followed by an indication of the system to which the device is connected. For instance, if the network device 202 had an identification number of WA01BC992, the secondary datacenter may give the network device 202 the address WA01BC992@datacenter2.VoIPSystem.net. Similarly, the primary datacenter 204*a* may give the network device 202 the address WA01BC992@datacenter1.VoIPSystem.net.

Alternatively, the address may not indicate which datacenter 204 assigned the address to the network device 202. For example, the address may be the same for the network device 202 regardless of which datacenter 204 assigned the address. For instance, as the above example sets forth, the address of the network device 202 may be WA01BC992@VoIPSystem.net. In addition, when a datacenter 204 connects with the network device 202, it may assign an address that is independent from addresses previous assigned to the network device 202 by other datacenters 204.

Also, as described above in greater detail, the session initiator 214 may enable user communications on the network device 202 by employing the services offered by the session facilitator 228 located on the datacenter 204. For example, the session facilitator 228 may facilitate a communication session between the two users. For instance, the session facilitator 228 may establish a media bridge connection between the network devices of the two users.

In some example embodiments, the session facilitator 228 may also monitor the media bridge connection for faults or weakening conditions. For instance, the session facilitator 228 can monitor the current communication session by receiving status updates from the one of the network devices participating in the communication session. Accordingly, even though two network devices are directly connected each other, the datacenter 204 may continue to monitor the status of the communication session between the two network devices.

As briefly described above, the session facilitator 228 may establish a media bridge connection between two devices by providing the requesting network device 202 a connection path between the network device 202 and a second network device associated with the intended recipient. For example, the user may request to participate in a communication session with the second user. The network device 202 associated with the user may request that the session facilitator 228 provide a media bridge connection. The session facilitator 228 may first look up the address of the second network device associated with the second user, for example, by looking up the address of the second network device in the device database 230. The session facilitator 228 may then determine a media bridge connection path between the network device 202 and the second network device and provide the media bridge connection to the network device 202.

In one or more embodiments, the session facilitator 228 may determine the media bridge connection path by selecting one media bridge connection path from among multiple media bridge connection paths between two network devices. For example, the session facilitator 228 may assess multiple potential media bridge connection paths and select the optimal media bridge connection path. For instance, the session facilitator 228 may monitor connection factors, analyze network characteristics associated with the connection factors, and determine connectivity metrics for each potential media bridge connection. For example, connection factors include, but are not limited to, the shortest response time between the network device 202 and the second network device, number of hops, quality of network media bridge connection, reliability of the media bridge connection path, amount of network traffic, geographic distance traveled, etc. The session facilitator 228 may compare connectivity metrics, as described above, and provide the optimal media bridge connection to the requesting network device 202.

Figure 3A:
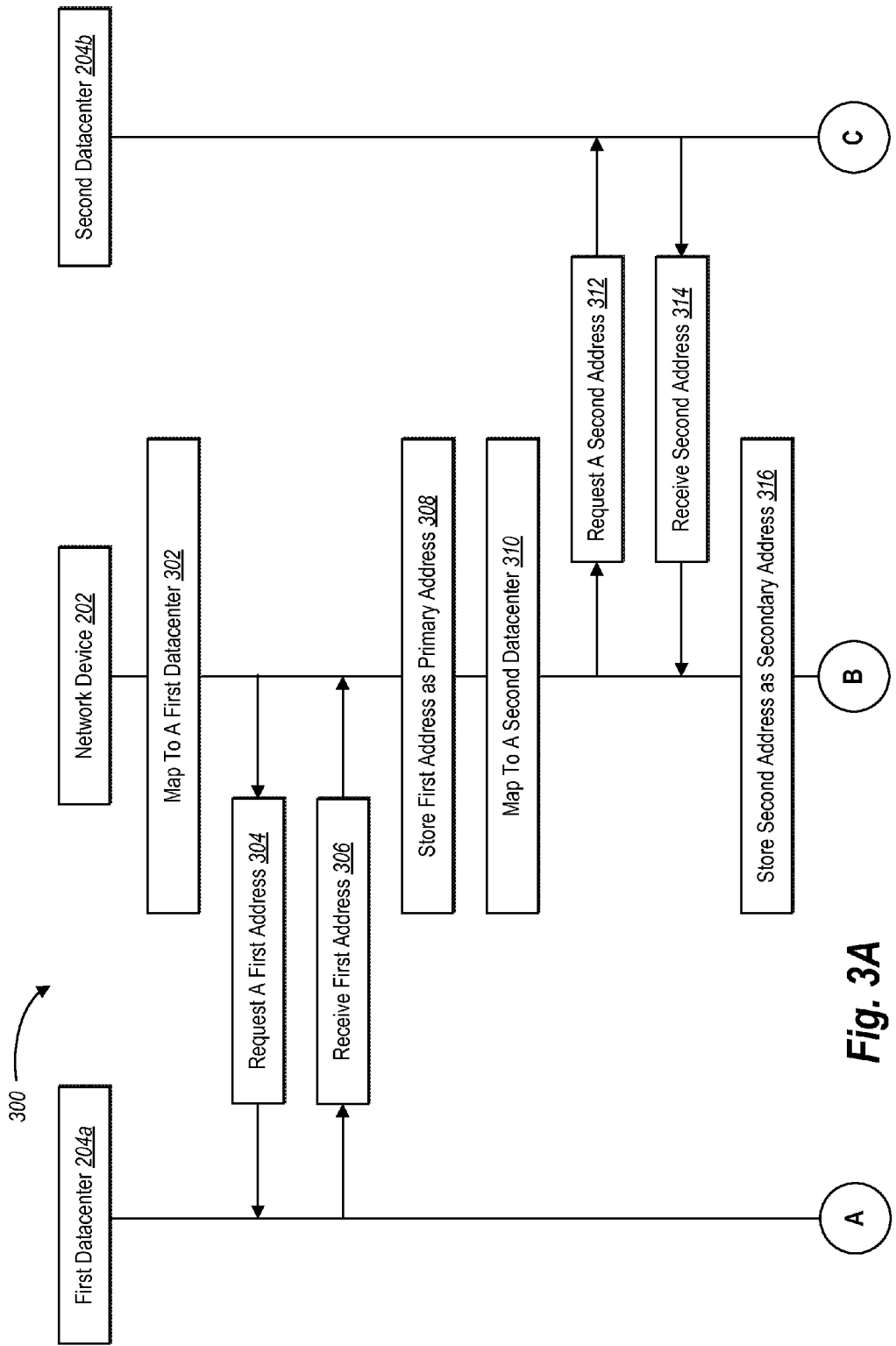
FIGS. 3A-3B illustrate a sequence-flow diagram illustrating interactions between the network device, a primary datacenter, and a secondary datacenter in the VoIP communication system of FIG. 2 in accordance with one or more embodiments disclosed herein.
Figure 3B:
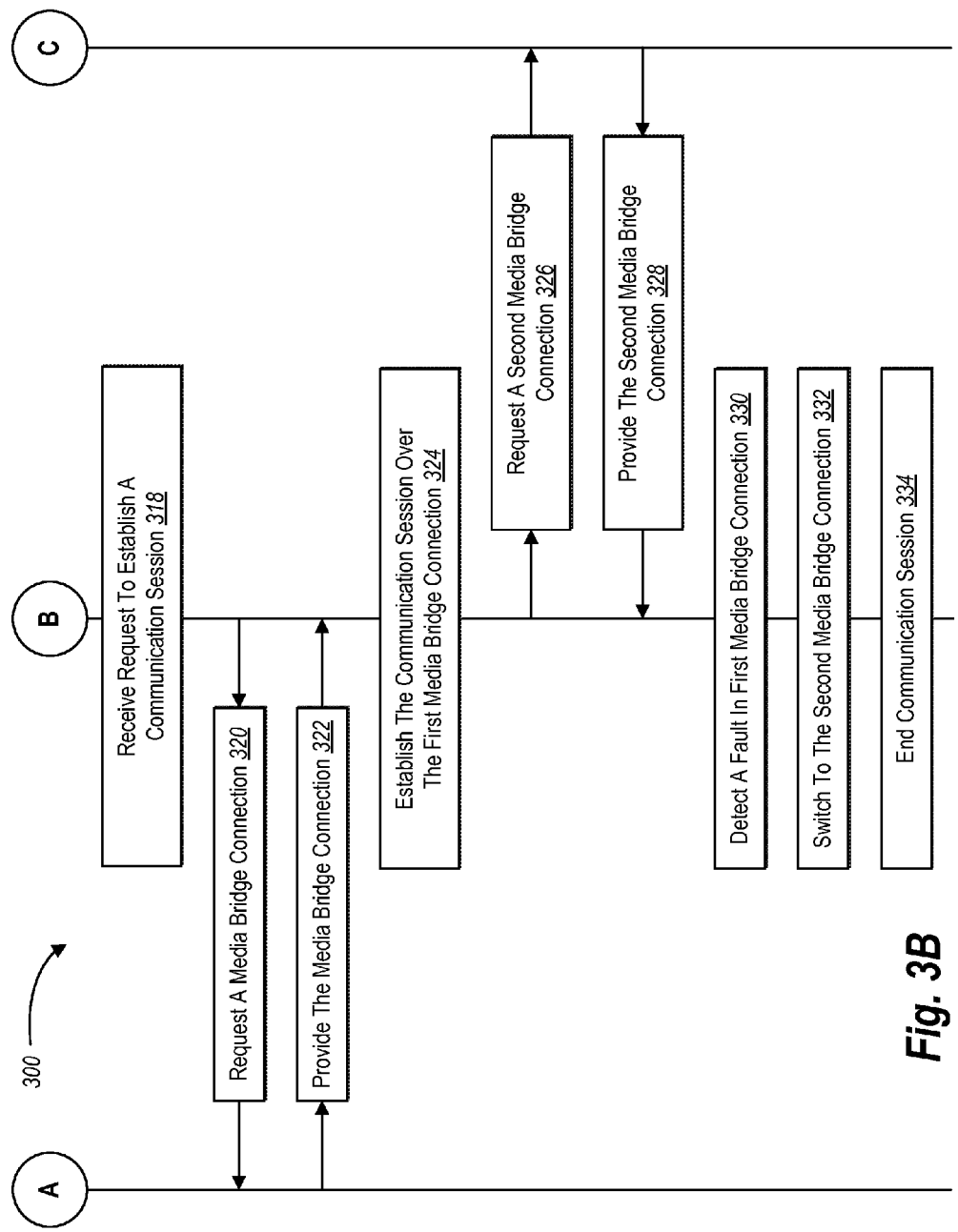

FIGS. 3A & 3B illustrate a sequence-flow 300 illustrating interactions between a network device 202, the primary datacenter 204*a*, and the secondary datacenter 204*b* in the VoIP communication system 200 of FIG. 2 in accordance with one or more embodiments disclosed herein. In particular, the sequence-flow 300 of FIGS. 3A & 3B illustrate an example sequence of the network device 202 jointly mapping to multiple datacenters 204 as well as providing fault tolerance during a communication session.

To illustrate, in step 302 the network device 202 may map to a primary datacenter 204*a*. Mapping to the primary datacenter 204*a* may include configuring, or setting, the network device 202 to connect to the primary datacenter 204*a*. For example, the provisioner 212 may map to the primary datacenter 204*a* by setting the primary datacenter's 204*a* address as an outgoing address. In addition, in some example embodiments, the network device 202 may remap to the primary datacenter 204*a*, as described above.

Further, in some embodiments, step 302 can include obtain a hostname or address name of a VoIP system 200 the network device 202 is first powered on. For example, when the network device 202 is first powered on, the network device 202 can connect to a third-party, such as a manufacturer of the network device 202, to obtain an address for the primary datacenter 204*a*. Alternatively, as describe above, the network device 202 can have an addresses or hostname associated with the primary datacenter 204*a* stored on the network device 202.

Step 304 may include the network device 202 requesting a primary address from the primary datacenter 204*a*. For example, the network device 202 may send an identification number to the VoIP system 200 when requesting an address. The identification number may be unique to the network device 202 requesting an address, such as the phone number assigned to the network device 202. Alternatively, the identification number may be a number randomly assigned by the VoIP system 200.

Step 306 may include the network device 202 receiving the primary address from the primary datacenter 204*a*. For example, the provisioner 212 on the network device 202 may receive the requested address. Further, the provisioner 212 may send the received address to the datacenter database 210. As described above, the address assigned to the network device 202 may be datacenter specific and/or independent from the previous address assigned to the network device 202.

In particular, when the network device 202 requests a primary address from the primary datacenter 204a, the primary datacenter 204a may assign an address to the network device 202 and register the network device 202. As described above, the address assignor 226a on the primary datacenter 204a may assign the primary address to the network device 202. Further, the address assignor 226a may register the network device 202 with the VoIP system 200 as well as notify other devices on the VoIP system 200, such as other datacenters 204, of the address assigned to network device 202. Once the network device 202 is assigned an address, the network device 202 may be connected to the datacenter 204 that assigned the address. In some instances, the network device 202 may establish a connection with the primary datacenter 204a using a signaling protocol, such as SIP.

Step 308 may include the network device 202 storing the primary address 220. For example, the provisioner 212 may store the primary address as the primary address 220 in the datacenter database 210. As described above, the primary datacenter 204a may be recognized as the primary datacenter when the address received from the primary datacenter 204a is stored as the primary address 220.

Step 310 may include the network device 202 mapping to a secondary datacenter 204b. For example, the network device 202 maps to the secondary datacenter 204b while still being mapped to and connected with the primary datacenter 204a. Mapping to the secondary datacenter 204b may include setting the network device 202 to also connect to the secondary datacenter 204b. Accordingly, as illustrated in FIGS. 3A & 3B, the network device 202 may jointly map to both the primary datacenter 204a and the secondary datacenter 204b.

Step 312 may include the network device 202 requesting a secondary address. In particular, the network device 202 may request the secondary address from the secondary datacenter 204b. Requesting an address from a datacenter 204 is described above in greater detail. For example, the address assignor 226b on the secondary datacenter 204b may assign the secondary address to the network device 202.

Step 314 may include the network device 202 receiving a secondary address from the secondary datacenter 204b. For example, the provisioner 212 on the network device 202 may receive the requested secondary address. Further, the provisioner 212 may store the received secondary address as the secondary address 222 in the datacenter database 210. As described above, the secondary datacenter 204b may be recognized as the secondary datacenter when the address received from the secondary datacenter 204b is stored as the secondary address 222.

Step 316 may include the network device 202 storing the secondary address 222. For example, the provisioner 212 may store the secondary address as the secondary address 222 in the datacenter database 210. As described above, the secondary datacenter 204b may be identified as the secondary datacenter when the address received from the secondary datacenter 204b is stored as the secondary address 222.

After the network device 202 receives one or both addresses, the network device 202 may initiate communication sessions with other network devices. For example, once the primary address 220 for the primary datacenter 204a is stored in the datacenter database 210, a user associated with the network device 202 may request to contact a second user via the primary datacenter 204a. The network device 202 may map to and connect with the secondary datacenter 204b either before or after the communication session is initiated. However, in general, the network device 202 is connected to both the primary datacenter 204a and the secondary datacenter 204b before the user requests to initiate a communication session.

As illustrated in FIG. 3B, step 318 may include the network device 202 receiving a request to establish a communication session. As described above, a user associated with the network device 202 requests to contact other users. For example, the user desires to call or videoconference with a second user. In this case, the network device 202 receives input from the user indicating the user's desire to establish a communication session.

In response to the request, the network device 202 may request that a datacenter 204 provide a media bridge connection for the communication session. As illustrated, step 320 may include the network device 202 requesting the establishment of a media bridge between the network device 202 and the second network device associated with the second user. The network device 202 may send the request to the primary datacenter 204a. For example, the session initiator 214 may send the request for a primary media bridge connection to the primary datacenter 204a.

Step 322 may include the primary datacenter 204a providing a primary media bridge connection to the network device 202. The primary datacenter 204a may provide the primary media bridge connection in response to the request to establish a media bridge. For example, the session facilitator 228a on the primary datacenter 204a may determine the primary media bridge connection and provide the primary media bridge connection to the network device 202, as described above.

Step 324 may include the network device 202 establishing the communication session over the primary media bridge connection. For example, the session initiator 214 on the network device 202 may employ the primary media bridge connection, provided by the primary datacenter 204a, to initiate a communication session with the second user. Accordingly, the user may communicate with the second user in real-time over the primary media bridge connection.

Step 326 may include the network device 202 requesting a secondary media bridge connection from the secondary datacenter. As illustrated in FIG. 3B, the network device 202 may send the request to the secondary datacenter 204b. For example, the session initiator 214 may send the request for a secondary media bridge connection to the secondary datacenter 204b.

Step 328 may include the secondary datacenter 204b providing a secondary media bridge connection to the network device 202. The secondary datacenter 204b may provide the secondary media bridge connection in response to the request for the secondary media bridge connection. The secondary media bridge connection may also provide a media bridge connection between the network device 202 and the second network device. In some instances, the network device 202 may negotiate a media bridge connection with the secondary datacenter 204b using a signaling protocol, such as SIP. For example, the secondary datacenter 204b may use SIP signaling to notify the network device 202 of the secondary media bridge connection.

The network device 202 may receive the secondary media bridge connection. The network device 202 may hold the secondary media bridge connection in standby as a backup media bridge connection while actively employing the primary media bridge connection to host the communication session. As noted above, although the primary media bridge connection and the secondary media bridge connection each provide a media bridge between the network device 202 and the second network device, the primary media bridge connection and the secondary media bridge connection generally employ different network paths, although some overlap may occur in one or more embodiments. Thus, when a fault occurs in one media bridge connection, it generally will not affect the other media bridge connection.

While steps 326-328 are illustrated after step 324, in some example embodiments, the network device 202 may request and receive the secondary media bridge connection from the secondary datacenter 204b before establishing the communication session. Additional detail regarding the various embodiments associated with requesting, receiving, and employing media bridge connections are provided above.

Step 330 may include the network device 202 detecting a fault in the primary media bridge connection. For example the connection monitor 216 on the network device 202 may detect that the primary media bridge connection has developed a fault or has failed. Additional detail regarding detecting faults in media bridge connections is described above.

Upon detecting a fault in the primary media bridge connection, the network device 202 may switch the communication session to the secondary media bridge connection. This is illustrated in step 330. For example, when the connection monitor 216 detects a fault in the primary media bridge connection, the connection facilitator 218 may switch the communication session over to the secondary media bridge connection. In this manner, the communication session may continue seamlessly without either user noticing the fault.

In some example embodiments, steps 326-328 may occur after step 330. For example, the network device 202 may detect a fault in the primary media bridge connection. Upon detecting the fault, the network device 202 may request a secondary media bridge connection from the secondary datacenter, as describe in step 326. The network device 202 may then receive the requested secondary media bridge connection from the secondary datacenter 204b, as illustrated in step 328. Upon receiving the secondary media bridge connection, the network device 202 may switch the communication session from the primary media bridge connection to the secondary media bridge connection, as described in connection with steps 330.

In addition, in one or more embodiments, steps 320-322 may be repeated to obtain a new primary media bridge connection. In these embodiments, the network device 202 may hold the new primary media bridge connection as a backup media bridge connection in the event that the now active secondary media bridge connection develops a fault. In this manner, the system and methods disclosed herein provide multiple layers of fault tolerance to the VoIP system 200 to ensure that communication sessions between users do not fail.

In some example embodiments, the datacenter 204 providing the backup media bridge connection may continuously update the backup media bridge connection based on changing network conditions. For example, the secondary datacenter 204b provides a secondary media bridge connection to the network device 202. While the network device 202 users the primary media bridge connection for the communication session, the secondary datacenter 204b may continue to check for a better media bridge connection between the network device 202 and the second network device. If the secondary datacenter 204b discovers a superior media bridge connection, the secondary datacenter 204b may provide the superior secondary media bridge connection to the network device 202. The network device 202 may then choose to switch over the communication session to the newly received secondary media bridge connection or hold the newly received secondary media bridge connection in reserve, as described above.

Step 334 may include the network device 202 ending the communication session. For example, the network device 202 may communicate to both the primary datacenter 204a and the secondary datacenter 204b to teardown the media bridge connections. In particular, the session initiator 214 may signal to each session facilitator 228 to no longer provide or monitor the provided media bridge connections.

Figure 4A:
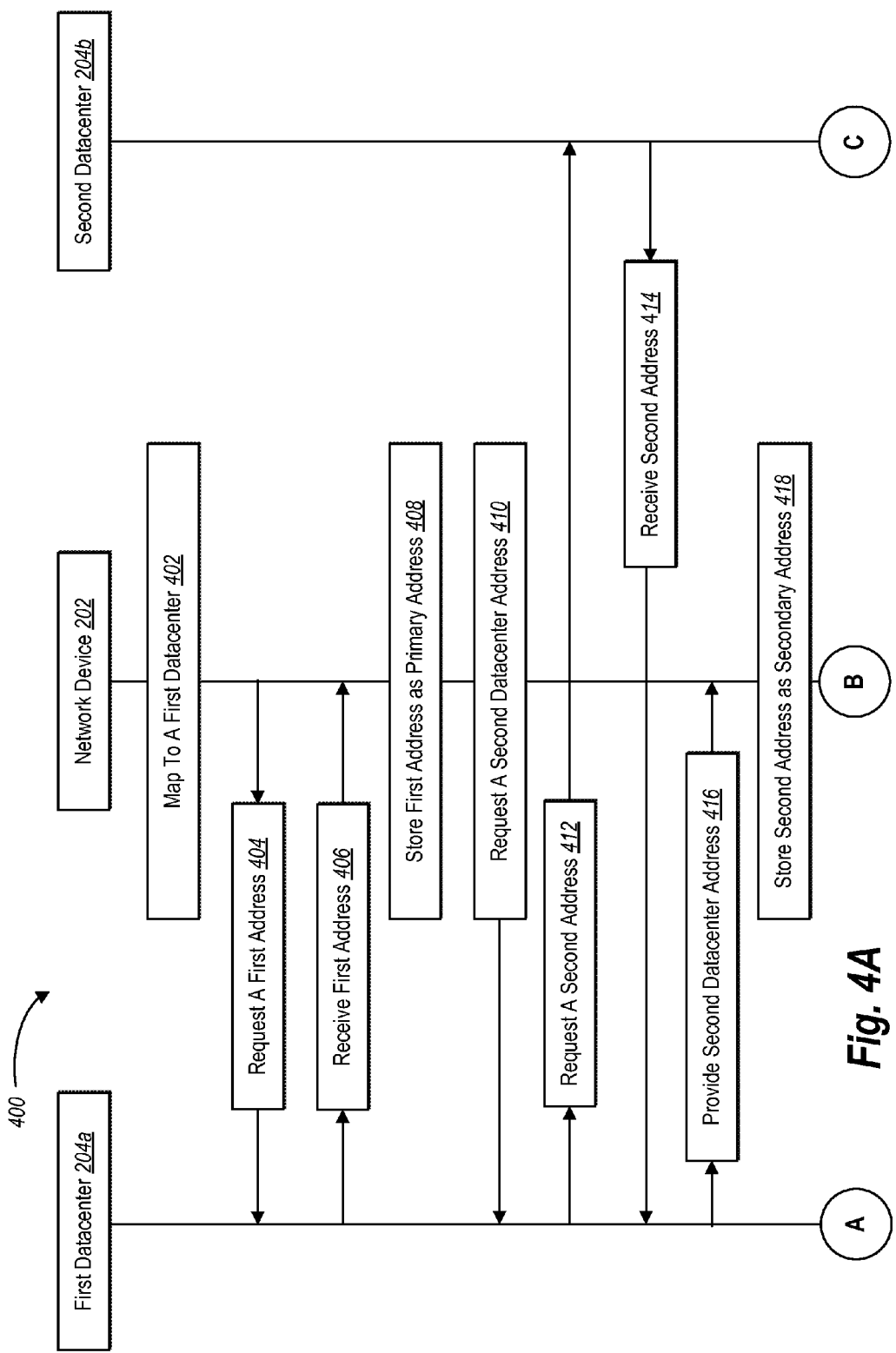
FIGS. 4A-4B illustrate another sequence-flow diagram illustrating interactions between the network device, a primary datacenter, and a secondary datacenter in the VoIP communication system of FIG. 2 in accordance with one or more embodiments disclosed herein.
Figure 4B:
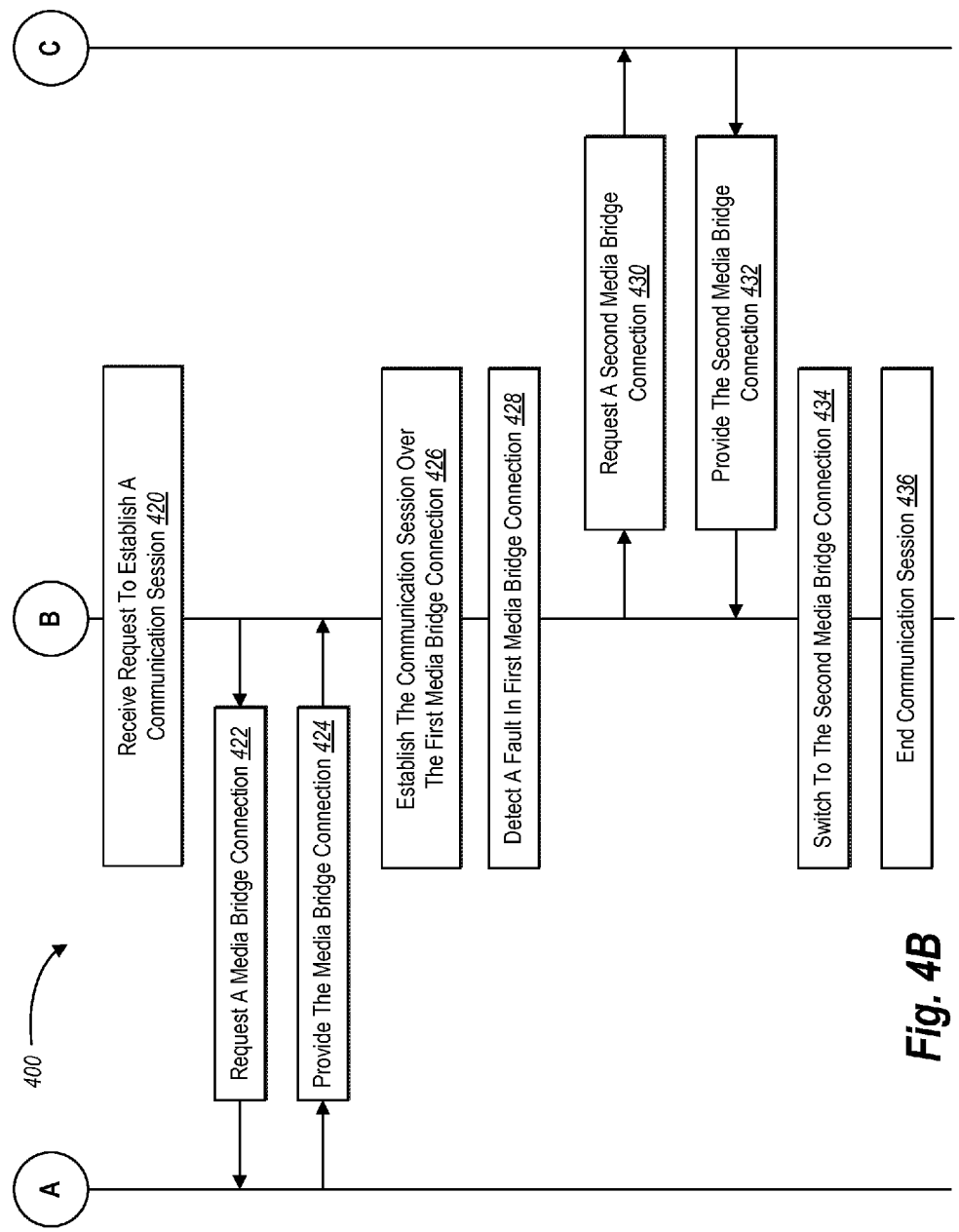

FIGS. 4A & 4B illustrate a sequence-flow 400 illustrating interactions between a network device 202, the primary datacenter 204a, and the secondary datacenter 204b in the VoIP communication system 200 of FIG. 2 in accordance with one or more embodiments disclosed herein. In particular, the sequence-flow 400 of FIGS. 4A & 4B illustrate an example sequence of the VoIP system 200 providing fault tolerance to a network device 202 during a communication session.

To illustrate, in step 402 the network device 202 may map to a primary datacenter 204a, as described above. Also as described above, in steps 404 and 406, the network device 202 can request and receive a primary address from the primary datacenter 204a. Further, step 408 may include the network device 202 storing the primary address 220, as described above.

Step 410 may include requesting a second datacenter address 414 from the first datacenter 204a. For example, because the network device 202 is mapped to the first datacenter 204a, the network device 202 can request a second address from the first datacenter 204a. The first datacenter 204a may facilitate the request by obtaining a second address for the network device 202 from the second datacenter 204b. For example, as illustrated in steps 412 and 414, the first datacenter 204a can request and receive a second address for the network device 202 from the second datacenter 204b. Upon obtaining a second address for the network device 202 from the second datacenter 204b, the first datacenter 204a can provide the second address to the network device 202, as illustrated in step 418.

Step 418 may include the network device 202 storing the secondary address 222, as described above. As illustrated in FIG. 4B, step 420 may include the network device 202 receiving a request to establish a communication session, as described above. In addition, as described above, step 422 and 424 may include the network device 202 requesting a primary media bridge connection and the first datacenter 204a providing the primary media bridge connection. Upon receiving the media bridge connection, the network device 202 may establish the communication session over the primary media bridge connection, as shown in step 426, and as described above.

Step 428 may include the network device 202 detecting a fault in the primary media bridge connection. For example, a connection monitor 216 on the network device 202 may detect that the primary media bridge connection has developed a fault or has failed. Alternatively, a connection monitor on one of the datacenters 204 can detect a fault in the primary media bridge connection.

Upon detecting a fault in the primary media bridge connection and as described above, the network device 202 may request a second media bridge connection and the second datacenter 204b can provide the second media bridge connection, as illustrated in steps 430 and 432. Subsequently, step 434 may include the network device 202 switching the communication session to the secondary media bridge connection, as described above.

Step 436 may include the network device 202 ending the communication session. For example, the network device 202 may communicate to both the primary datacenter 204a and the secondary datacenter 204b to teardown the media bridge connections. In particular, the session initiator 214 may signal to each session facilitator 228 to no longer provide or monitor the provided media bridge connections, as described above.

Figure 5:
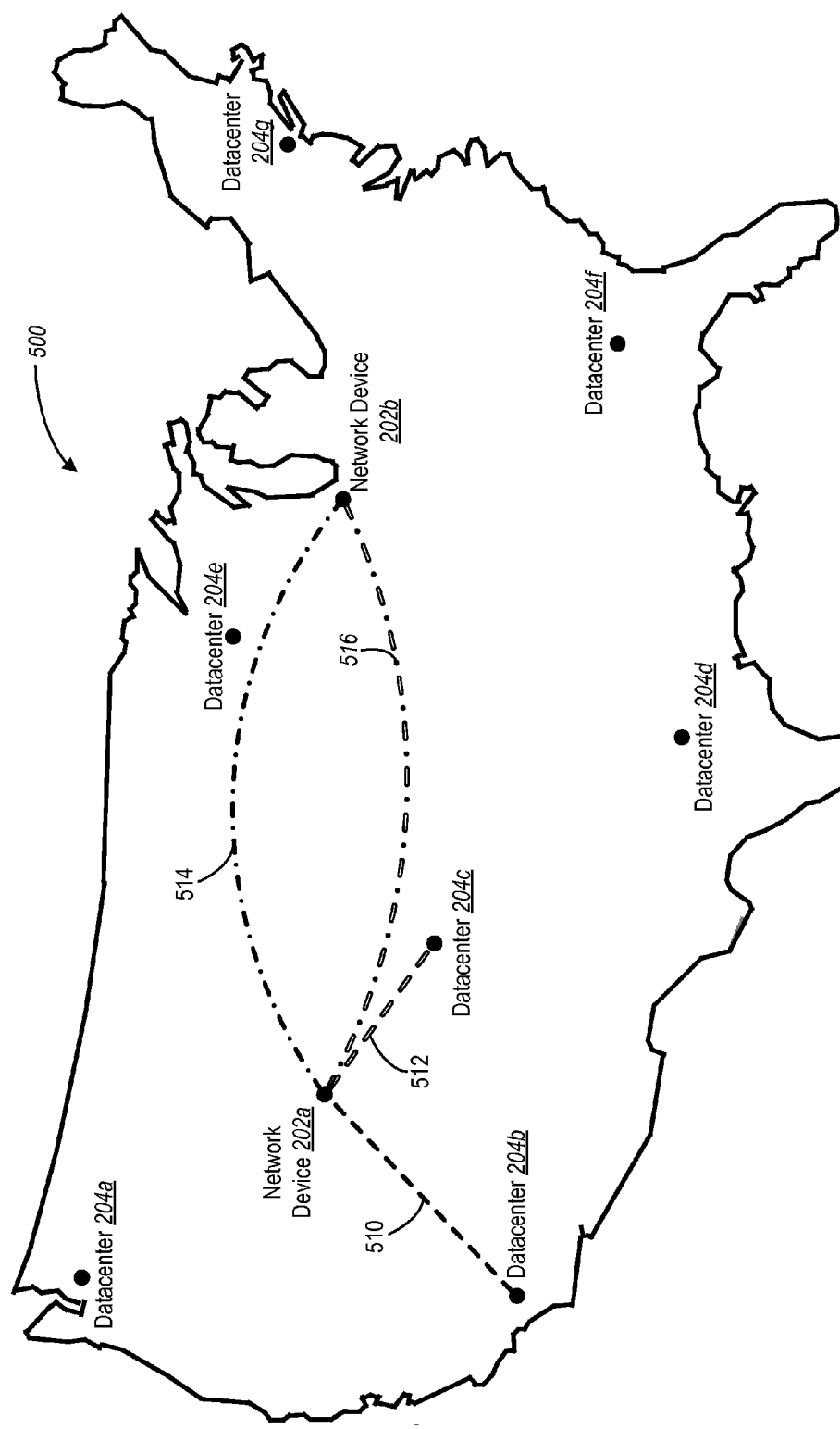
FIG. 5 illustrates a map schematic where the VoIP communication system of FIG. 2 may be utilized in accordance with one or more embodiments disclosed herein.

FIG. 5 illustrates a map schematic 500 where the VoIP communication system 200 of FIG. 2 may be utilized according to principles described herein. In particular, FIG. 5 illustrates a map 500 of the United States where the VoIP system 200 may be employed. One of skill in the art will note, that while FIG. 5 illustrates a map of the United States, the embodiments, configurations, and systems disclosed herein are not limited to any particular geographic regions. For example, the VoIP system 200 may operate across a number of countries, regions, and continental boundaries. For instance, VoIP communication may utilize communication devices located in space.

As illustrated in FIG. 5, the map 500 includes two network devices 202a-b and seven datacenters 204a-g. The datacenters 204 may be geographically distributed throughout the map 500. For example, FIG. 5 illustrates a datacenter 204 in Seattle, Los Angeles, Denver, Dallas, Minneapolis, Atlanta, and New York City. One of skill in the will appreciate that the datacenters 204 are not limited to any particular geographic locations. Similarly, the network devices 502 are also not location specific.

For simplicity, only two network devices 202 are illustrated. In particular, the first network device 202a is located in Salt Lake City, and the second network device 202b is located in Chicago. While not illustrated, the map 500 may include a number of other network devices 202. For example, multiple network devices 202 may be located in the same location as well as located throughout various locations.

As shown in FIG. 5, the solid dashed line 510 illustrates a connection between the first network device 202a and the Los Angeles datacenter 204b (hereafter "primary datacenter connection 510"). The hollow dashed line 512 illustrates a connection between the first network device 202a and the Denver datacenter 204c (hereafter "secondary datacenter connection 512"). The solid dash-dotted line illustrates a primary media bridge connection between the first network device 202a and the second network device 202b provided by the Los Angeles datacenter 204b (hereafter "primary media bridge connection 514"). The hollow dash-dotted line illustrates a secondary media bridge connection between the first network device 202a and the second network device 202b provided by the Denver datacenter 204c (hereafter "secondary media bridge connection 516").

As illustrated in FIG. 5, a first user in Salt Lake City may desire to communicate with a second user in Chicago. The first user in Salt Lake City may be associated with the first network device 202a, and the second user in Chicago may be associated with the second network device 202b. However, before either user can participate in a communication session, each network device 202 must be mapped to and register with one of the datacenters 204.

The first network device 202a may map to one or more datacenters 204. For example, as illustrated in FIG. 5, the first network device 202a maps to the Los Angeles datacenter 204b. Further, the first network device 202a also maps to the Denver datacenter 204c. As described above in greater detail, network devices 202 may jointly map to multiple datacenters 204.

After mapping to multiple datacenters 204, the first network device 202a may connect to each of the datacenters 204. For example, the first network device 202a may connect to the Los Angeles datacenter 204b via the primary datacenter connection 510. The first network device 202a may also connect to the Denver datacenter 204c via the secondary datacenter connection 512. As illustrated in FIG. 5, the Los Angeles datacenter 204b may be the primary datacenter and the Denver datacenter 204c may be the secondary datacenter.

Once the first network device 202a and the second network device 202b are each connected to one or more datacenters 204, the first user and the second user may participate in a communication session. For example, the first user may call the second user. Specifically, when calling the second user, the first network device's 202a session initiator 214 notifies the Los Angeles datacenter 204b, via the primary datacenter connection 510, that the first network device 202a would like to connect with the second network device 202b.

In particular, the session initiator 214 on the first network device 202a may request that the Los Angeles datacenter 204b provide a media bridge connection. In response the Los Angeles datacenter 204b may provide the primary media bridge connection. For example, the Los Angeles datacenter 204b may provide a primary media bridge connection 514. The network device 202 may employ the primary media bridge connection 514 to establish the communication session with the second user.

The first network device 202a may also request the Denver datacenter 204c provide a secondary media bridge connection. In response the Denver datacenter 204c may provide the secondary media bridge connection 516. For example, the Denver datacenter 204c may provide a secondary media bridge connection 516. The network device 202 may maintain the secondary media bridge connection 516 as a backup media bridge for the communication session with the second user.

In one or more embodiments, a datacenter connection may be independent from the media bridge connection provided to the network device by the datacenter 204. For example, the primary datacenter connection 510 and the primary media bridge connection 514 may be independent connections. For instance, even if the connection paths geographically overlap, the two connections may remain isolated from each other. The connections may be independent because the primary datacenter connection 510 may require a lesser quality connection to support signaling small packets of data, while the primary media bridge connection 514 may require a higher quality connection to support larger packets of real-time media communication data.

Alternatively, in one or more embodiments, the connection between the network device 202 and the datacenter 204 may overlap for a portion of each connection. For example, the media bridge connection between the first network device 202a and the second network device 202b can route through the one or more datacenters 204. For instance, the media bridge connection may route through the Denver datacenter 204c (not illustrated). Additionally or alternatively, the media bridge may be routed though other datacenters 204.

As another example, the secondary datacenter connection 512 and the secondary media bridge connection 516 may overlap for a portion of the two connections. Accordingly, the datacenter 204 may directly detect if a fault occurs in the shared portion of the two connections. Additionally, the datacenter 204 may monitor network characteristics for the media bridge connection provided to the network device 202 based, at least in part, on the network characteristics exhibited over the shared portion of the connections. The process of monitoring network characteristics is discussed above in greater detail.

During the communication session, a fault may occur in the primary media bridge connection 514. The VoIP system 200 may detect the fault. For example, in one or more embodiments, the connection monitor 216 on the first network device 202a may detect the fault. In an alternate embodiment, the primary datacenter 204a may detect the fault on the primary media bridge connection 514. When a fault is detected on the primary media bridge connection, the first network device 202a may switch the communication session to the secondary media bridge connection 516. The transition is such that neither the first user nor the second user detects the changeover.

Figure 6:
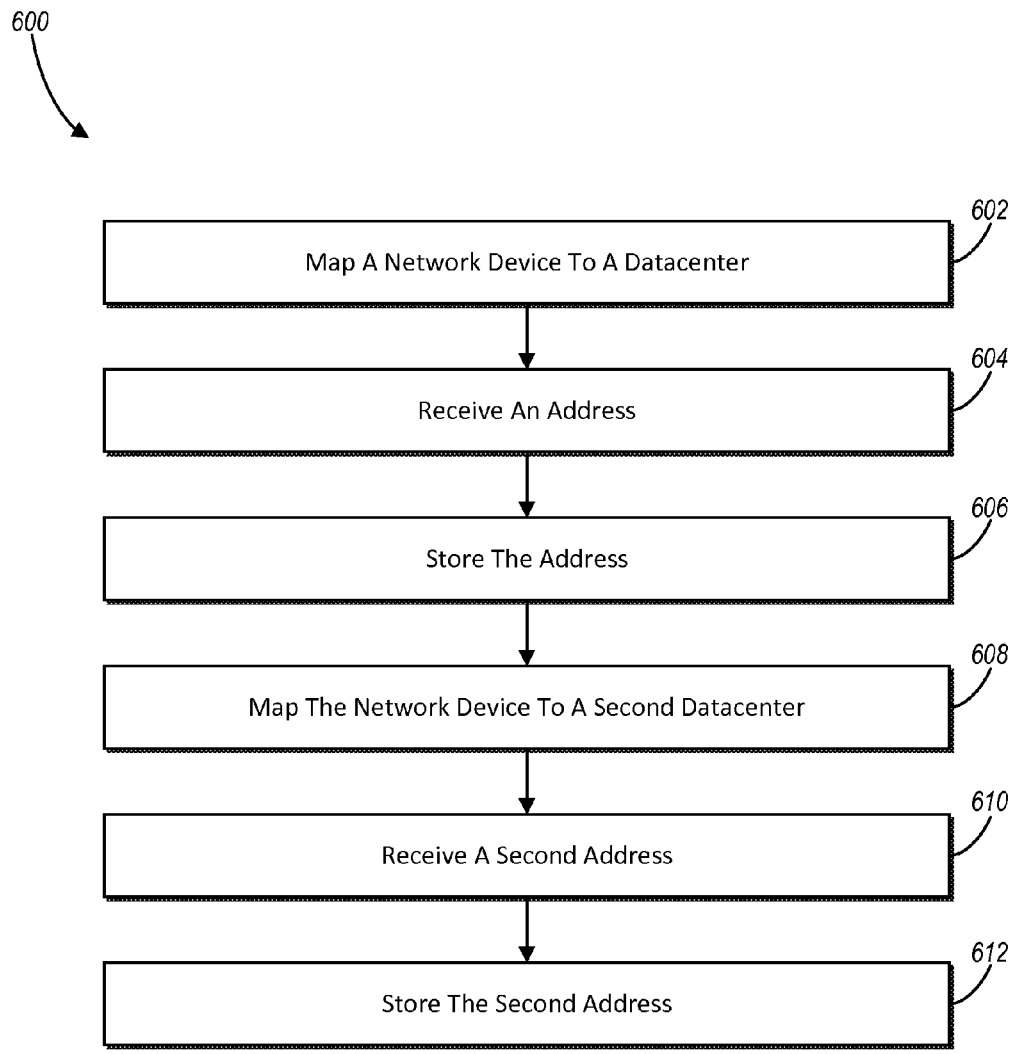
FIG. 6 illustrates a method of establishing a connection between a network device and multiple datacenters on a network based communication system in accordance with one or more embodiments disclosed herein.
Figure 7:
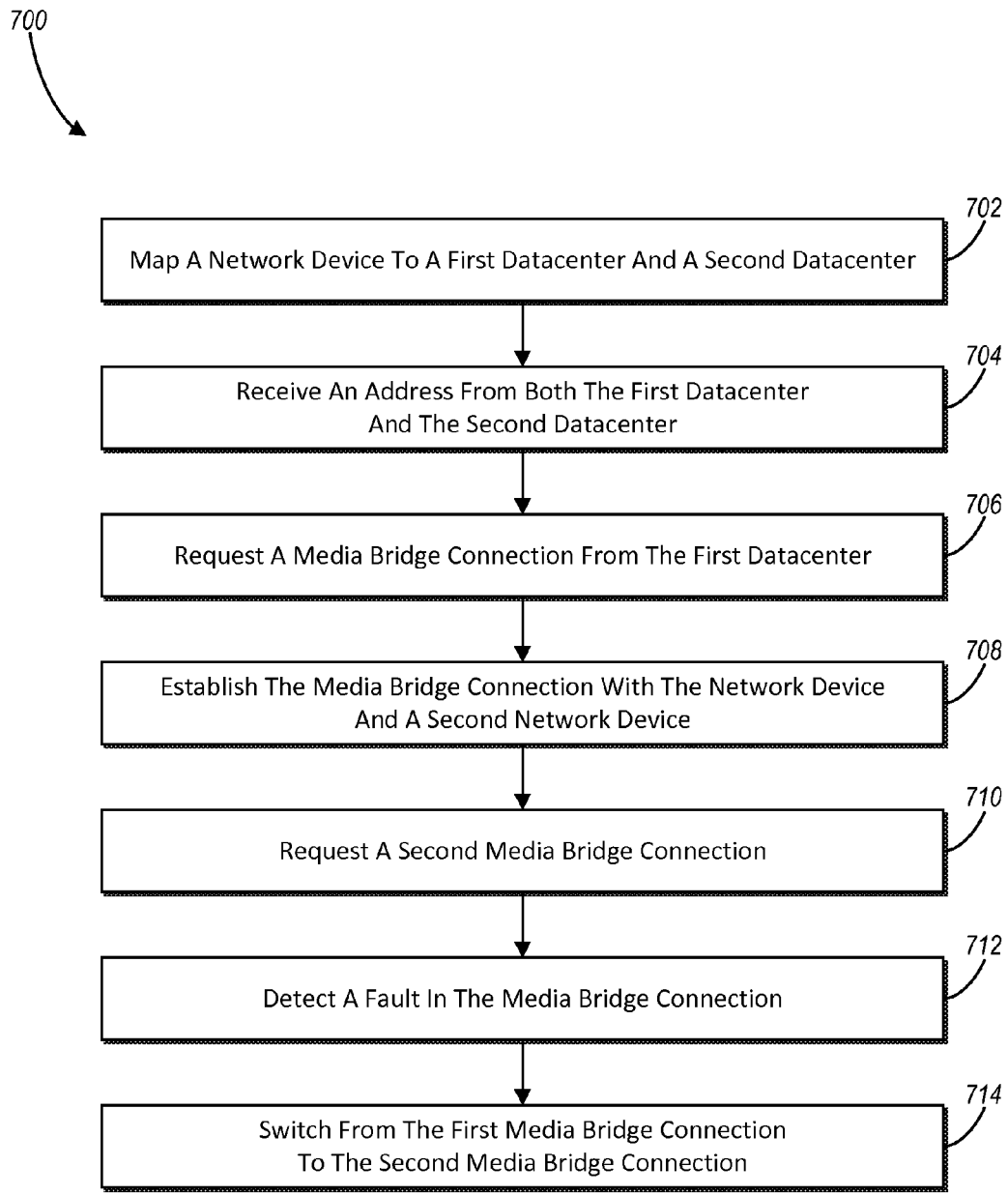
FIG. 7 illustrates another method of providing increased fault tolerance for a connection with a network device using a network based communication system in accordance with one or more embodiments disclosed herein.

FIGS. 1-5, the corresponding text, and the examples, provide a number of different systems and devices for providing a network based communication system. In addition to the foregoing, embodiments also can be described in terms of flowcharts comprising acts and steps in a method for accomplishing a particular result. For example, FIGS. 5-7 illustrate flowcharts of example methods in accordance with one or more embodiments. The methods described in relation to FIGS. 5-7 may be performed with less or more steps/acts or the steps/acts may be performed in differing orders. Additionally, the steps/acts described herein may be repeated or performed in parallel with one another or in parallel with different instances of the same or similar steps/acts. One or more of the steps shown in FIGS. 5-7 may be performed by any component or combination of components of system 200.

FIG. 6 illustrates a flowchart of one exemplary method 600 of establishing a connection between a network device 202 and multiple datacenters 204 on a network based communication system, such as a VoIP system 200. Step 602 may include mapping a network device 202 to a datacenter 204. In particular, step 602 may include mapping a network device 202 to a primary datacenter 204a. For example, the network device 202 may employ the provisioner 212 on the network device 202 to map the network device 202 to the primary datacenter 204a in any suitable manner, such as described herein. In addition, the network device 202 may request an address from the primary datacenter 204a after being mapped to the primary datacenter 204a, as described herein.

Step 604 may include receiving an address. In particular, step 604 may include receiving a primary address associated with the primary datacenter 204a. For example, the provisioner 212 on the network device 202 may receive an address from the primary datacenter 204a based on the provisioner's 212 request for an address from the primary datacenter 204a in any suitable manner, such as described herein. The network device 202 may be registered with the VoIP communication system 200 upon receiving an address from the primary datacenter 204a.

Step 606 may include storing the address. In particular, step 606 may include storing the primary address 220. For example, the provisioner 212 on the network device 202 may store the primary address 220 in the datacenter database 210 in any suitable manner, such as described herein.

Step 608 may include mapping the network device 202 to a secondary datacenter 204b. In particular, step 608 may include mapping the network device 202 to a secondary datacenter 204b while maintaining the mapping to the primary datacenter 204a. For example, the provisioner 212 on the network device 202 may map to the secondary datacenter 204b while jointly being mapped to the primary datacenter 204a in any suitable manner, such as described herein. Accordingly, the system and methods described herein allow for multiple mappings between the network device 202 and multiple datacenters 204.

Step 610 may include receiving a secondary address. In particular, step 610 may include receiving a secondary address associated with the secondary datacenter 204b. For example, the provisioner 212 on the network device 202 may receive a secondary address from the secondary datacenter 204b based on the provisioner's 212 request for the secondary address from the secondary datacenter 204b in any suitable manner, such as described herein.

Step 612 may include storing the secondary address. In particular, step 612 includes storing the secondary address 222 in the datacenter database 210 while retaining the primary address 220. For example, the provisioner 212 on the network device 202 may store the secondary address 222 in the datacenter database 210 in any suitable manner, such as described herein.

FIG. 7 illustrates another method 700 of providing increased fault tolerance for a connection with a network device 202 using a network based communication system according to the principles described herein. Step 702 may include mapping a network device to a primary datacenter 204a and a secondary datacenter 204b. In particular, step 702 may include mapping a first voice-over Internet protocol device 202a to a primary datacenter 204a and a secondary datacenter 204b. For example, the network device 202 may employ a provisioner 212 to maps the network device 202 to the primary datacenter 204a and the secondary datacenter 204b in any suitable manner, such as described herein. In addition, the network device 202 may request an address from the primary datacenter 204a after being mapped to the primary datacenter 204a, and from the secondary datacenter 204b after being mapped to the secondary datacenter 204b in any suitable manner, such as described herein. As described above, in one or more embodiments, the network device 202 may be a VoIP device.

Step 704 may include receiving an address from both the primary datacenter 204a and the secondary datacenter 204b. In particular, step 704 may include receiving a primary address 220 from the primary datacenter 204a and receiving a secondary address 222 from the secondary datacenter 204b. For example, the provisioner 212 on the network device 202 may receive a primary address 220 from the primary datacenter 204a and a secondary address 222 from the secondary datacenter 204b in any suitable manner, such as described herein. The network device 202 may store the primary address 220 and the secondary address 222 in the datacenter database 210.

Step 706 may include requesting a media bridge connection from the primary datacenter 204a. In particular, step 706 may include requesting a primary media bridge connection from the primary datacenter 204a, where the primary media bridge connection connects the first voice-over internet protocol device 202a to a second voice-over internet protocol device 202b. For example, the session initiator 214 on the network device 202 may request the primary datacenter 204a to provide a media bridge connection in any suitable manner, such as described herein.

Step 708 may include establishing the media bridge connection with the network device 202a and a second network device 202b. In particular, step 708 may include establishing the primary media bridge connection between the first voice-over Internet protocol device 202a and the second voice-over Internet protocol device 202b. For example, the session initiator 214 on the network device 202 may use the primary media bridge connection provided by the primary datacenter 204a to establish a media bridge connection with the second network device 202b in any suitable manner, such as described herein. For instance, the session initiator 214 may use the provided primary media bridge connection to enable a communication session between users.

Step 710 may include requesting a secondary media bridge connection. In particular, step 710 includes requesting a secondary media bridge connection from the secondary datacenter 204b, where the secondary media bridge connection connects the first voice-over Internet protocol device 202a to the second voice-over Internet protocol device 202b. For example, the session initiator 214 on the network device 202 may request the secondary datacenter 204b to provide a secondary media bridge connection in any suitable manner, such as described herein. Upon receiving the secondary media bridge connection, the network device 202 may place the secondary media bridge connection on standby as a fallback media bridge connection. In other words, the secondary media bridge connection may be inactive while the network device 202 actively users the primary media bridge connection in connection with the communication session.

Step 712 may include detecting a fault in the media bridge connection. In particular, step 712 includes detecting a fault in the primary media bridge connection. For example, the connection monitor 216 on the network device 202 may detect a fault in the primary media bridge connection in any suitable manner, such as described herein.

Step 714 may include switching from the primary media bridge connection to the secondary media bridge connection. In particular, step 714 includes switching from the primary media bridge connection to the secondary media bridge connection upon detecting a fault in the primary media bridge connection. For example, when a fault on the primary media bridge connection is detected, the connection facilitator 218 on the network device 202 may switch the communication session from the primary media bridge connection to the secondary media bridge connection in any suitable manner, such as described herein. In this manner, if the primary media bridge connection fails or loses quality, the system may seamlessly transfer the communication session to the secondary media bridge connection without detection from either user.

Figure 8:
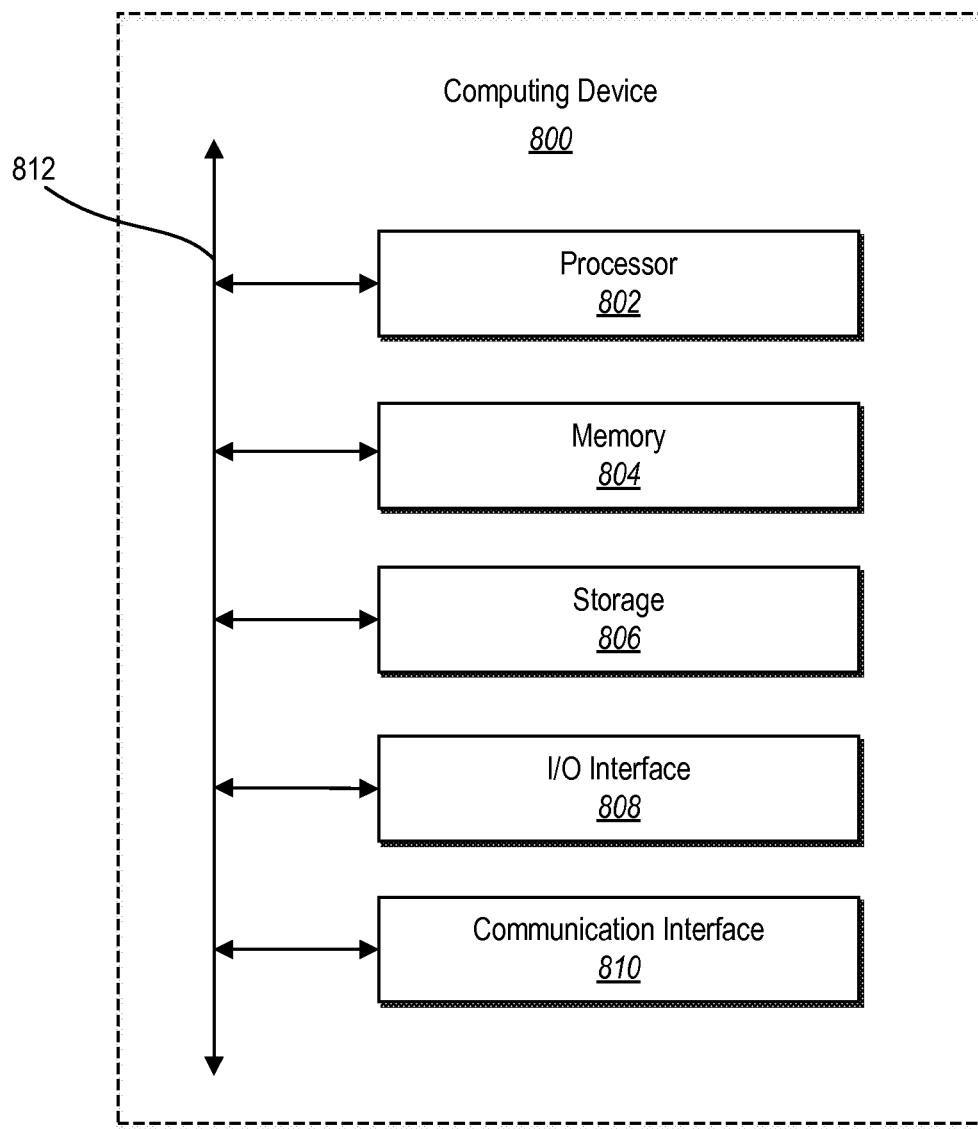
FIG. 8 illustrates a block diagram of a computing device according to the principles described herein.

FIG. 8 illustrates, in block diagram form, an exemplary computing device 800 that may perform one or more of the processes described above. One will appreciate that system 100, and/or VoIP system 200 each comprises one or more computing devices in accordance with implementations of computing device 800. As shown by FIG. 8, the computing device can comprise a processor 802, a memory 804, a storage device 806, an I/O interface 808, and a communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers ("TLBs"). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as random access memory ("RAM"), read only memory ("ROM"), a solid-state disk ("SSD"), flash, phase change memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive ("HDD"), a floppy disk drive, flash memory, an optical disc, a magneto-optical disc, magnetic tape, or a universal serial bus ("USB") drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In other embodiments, Storage device 806 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 provides graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller ("NIC") or network adapter for communicating with an Ethernet or other wire-based network or a wireless NIC ("WNIC") or wireless adapter for communicating with a wireless network, such as WI-FI.

Additionally or alternatively, communication interface 810 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 810 may facilitate communications with a wireless PAN ("WPAN") (such as, for example, a BLUETOOTH WPAN), a WI-FI network, a WI-MAX network, a cellular telephone network (such as, for example, a global system for mobile communications ("GSM") network), a satellite network, a navigation network, a broadband network, a narrowband network, the Internet, a local area network, or any other networks capable of carrying data and/or communications signals between a network device 102 and one or more datacenters 104.

To illustrate, the communication interface may communicate using any communication platforms and technologies suitable for transporting data and/or communication signals, including known communication technologies, devices, media, and protocols supportive of remote data communications, examples of which include, but are not limited to, data transmission media, communications devices, transmission control protocol ("TCP"), internet protocol ("IP"), file transfer protocol ("FTP"), telnet, hypertext transfer protocol ("HTTP"), hypertext transfer protocol secure ("HTTPS"), session initiation protocol ("SIP"), simple object access protocol ("SOAP"), extensible mark-up language ("XML") and variations thereof, simple mail transfer protocol ("SMTP"), real-time transport protocol ("RTP"), user datagram protocol ("UDP"), global system for mobile communications ("GSM") technologies, enhanced data rates for GSM evolution ("EDGE") technologies, code division multiple access ("CDMA") technologies, time division multiple access ("TDMA") technologies, short message service ("SMS"), multimedia message service ("MMS"), radio frequency ("RF") signaling technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an accelerated graphics port ("AGP") or other graphics bus, an enhanced industry standard architecture ("EISA") bus, a front-side bus ("FSB"), a hypertransport ("HT") interconnect, an industry standard architecture ("ISA") bus, an infiniband interconnect, a low-pin-count ("LPC") bus, a memory bus, a micro channel architecture ("MCA") bus, a peripheral component interconnect ("PCI") bus, a PCI-Express ("PCIe") bus, a serial advanced technology attachment ("SATA") bus, a video electronics standards association local ("VLB") bus, or another suitable bus or a combination thereof.

Figure 9:
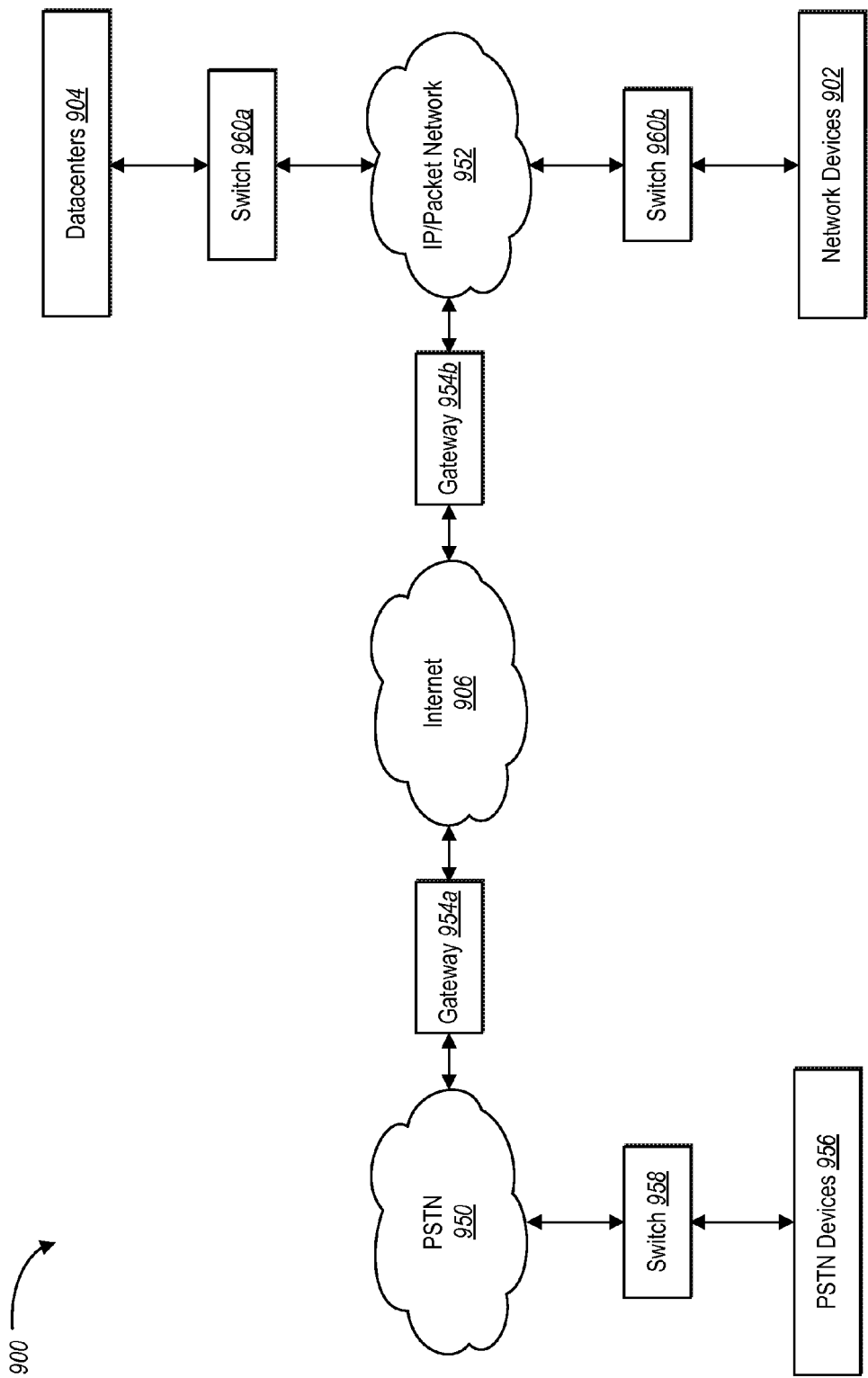
FIG. 9 illustrates an example network environment of a VoIP communication system according to the principles described herein.

FIG. 9 illustrates an example network environment of a telecommunications system 900 according to the principles described herein. In particular, the telecommunications system 900 may facilitate both network-based communication systems as well as circuited-switched traditional communication systems. For example, the telecommunications system 900 may allow a user calling from a traditional landline to converse with a user using a VoIP device. In addition, while FIG. 9 illustrates exemplary components and devices according to one embodiment, other embodiments may omit, add to, reorder, and/or modify any of the components and devices shown in FIG. 9.

The telecommunication system 900 may include a PTSN 950 and an IP/packet network 950. The PTSN 950 and the IP/packet network 952 may be connected via a network, such as the Internet 906 or over a private network. In some example embodiments, the PTSN 950 and/or the IP/packet network 952 may be connected to the Internet 906 via gateways 954a-b. For example, gateway 954b may be a signaling gateway and/or a media gateway. For instance, the signaling gateway processes and translates bidirectional SIP signals, and the media gateway handles real-time transport protocol communications. In addition, network trunks may interconnect the PTSN 950, the Internet 906, and the IP/packet network 950.

The PSTN 950 may connect to one or more PSTN devices 956. For example, a switch 958 may connect the one or more PSTN devices 956 to the PSTN 950. PSTN devices 956 may include a variety of devices ranging from traditional landline devices to mobile/cellular devices.

The PSTN 950 may include, but is not limited to telephone lines, fiber optic cables, microwave transmission links, cellular networks, communications satellites, and undersea telephone cables. Switching centers may interconnect each of this components and networks. Further, the PSTN 950 may be analog or digital. In addition, the PSTN 950 may use protocols such as common channel signaling system 8 ("CCS7"). CCS7 is a set of protocols used in the PSTN 950 to setup and tear down communications between subscribers (i.e., users).

As illustrated in FIG. 9, the telecommunications system 900 may include an IP/packet network 952. The IP/packet network 952 may be part of a network-based system, such as a VoIP communication system. VoIP systems are generally known for transmitting voice packets between users. However, VoIP systems also handle other forms of communication, such as video, audio, photographs, multimedia, data, etc. For example, VoIP systems provide communication services for telephone calls, faxes, text messages, and voice-messages.

The IP/packet network 952 provides communications services between users over the Internet 906 rather than using a traditional PSTN 950. However, VoIP systems also allow users to communicate with users using PSTN 950. Thus, a subscriber using a network device 902 may communicate with a subscriber using a PSTN device 956. Furthermore, VoIP systems allow users to communicate with each other without accessing the PSTN 950.

Embodiments disclosed herein may comprise or utilize a special purpose or general-purpose computer including computer hardware, such as, for example, one or more processors and system memory, as discussed in greater detail below. Embodiments within the scope disclosed herein also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the present disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some example embodiments, computer-executable instructions are executed on a general-purpose computer to turn the general-purpose computer into a special purpose computer implementing elements of the present disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system embodiments, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The present disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As illustrated in FIG. 9, the IP/packet network 952 may also include network devices 902 devices and datacenters 904. The network devices 902 devices and datacenters 904 illustrated in FIG. 9 may be example embodiments of the network device 202 and datacenters 204 described above. For example, example of network devices 902 include a variety of devices, such as personal computers, a tablet computer, handheld devices, mobile phones, smartphones, a personal digital assistants ("PDA"), in- or out-of-car navigation systems, and other electronic access devices. In addition, the network device 902 may be part of an enterprise environment, such as a professional business exchange ("PBX"), a small office/home office environment, or a home/personal environment.

As briefly described above, network devices 902 may include dedicated devices and soft devices. Dedicated devices are commonly designed and appear like a digital business telephone. Soft devices or softphones refer to software installed on a computing device. This software utilizes microphone, audio, and/or video capabilities of the computing device and provides traditional calling functionality to a user, operated via a user interface.

Datacenter 904 may facilitate communications between network devices 902. For example, datacenter 904 registers devices, stores device identification and address information, tracks current communications, and logs past communications, etc., as described above. In addition, datacenters 904 also assists network devices in provisioning, signaling, and establishing user communications via a media bridge.

In the case of multiple datacenters 904, one datacenter 904 may communicate with another datacenter 904. For example, one datacenter 904 may send gathered network device 902 information to the other datacenter 904. In particular, when a datacenter 904 registers a network device 902, that datacenter 904 may send the address information to the other datacenters 904 located on the IP/packet network 952. Accordingly, each datacenter 904 may communicate with others datacenters 904 and assist the IP/packet network 952 in balancing network and processing loads. Further, the datacenters 904 may assist the IP/packet network 952 to ensure that communication sessions between network devices 902 do not fail by communicating with each other.

As illustrated, the network devices 902 and the datacenters 904 may be connected to the IP/packet network 952 via switches 960a-b. Switches 960a-b manage the flow of data across the IP/packet network 952 by transmitting a received message to the device for which the message was intended. In some example embodiments, the switches 960a-b may also perform router functions. Further, while not illustrated, one or more modems may be in electronic communication with the switches 960a-b.

In addition, the IP/packet network 952 may facilitate session control and signaling protocols to control the signaling, set-up, and teardown of communication sessions. In particular, the IP/packet network 952 may employ SIP signaling. For example, the IP/packet network 952 may include a SIP server that processes and directs signaling between the network devices 902 and the IP/packet network 952. Other protocols may also be employed. For example, the IP/packet network 952 may adhere to protocols found in the H.225, H.323, and/or H.245 standards, as published by the International Telecommunications Union, available at the following URL—http://www.itu.int/publications.

In particular, session initiation protocol ("SIP") is a standard proposed by the Internet Engineering Task Force ("EITF") for establishing, modifying, and terminating multimedia IP sessions. Specifically, SIP is a client/server protocol in which clients issue requests and servers answer with responses. Currently, SIP defines requests or methods, including INVITE, ACK, OPTIONS, REGISTER, CANCEL, and BYE.

The INVITE request is used to ask for the presence of a contacted party in a multimedia session. The ACK method is sent to acknowledge a new connection. The OPTIONS request is used to get information about the capabilities of the server. In response to an OPTIONS request, the server returns the methods that it supports. The REGISTER method informs a server about the current location of the user. The CANCEL method terminates parallel searches. The client sends a BYE method to leave a session. For example, for a communication session between two network devices 902, the BYE method terminates the communication session.

Once signaling is established, the IP/packet network 952 may establish a media bridge, defined above. In addition, the media bridge caries the payload data for a communication session. The media bridge is separate for the device signaling. For example, in a videoconference, the media bride includes media, such as audio and video data for a communication session.

As described above a datacenter 904 may facilitate a media bridge connection path for a network device 902. For example, when one network device 902 attempts the contact a second network device 902, the datacenter 904 may execute the signaling and also determine a media bridge between the two network devices 902. Further, the datacenter 904 may provide alternate media bridge paths to the network devices 902 in the event that the primary media bridge weakens, for example, below a threshold level, or even fails.

In the foregoing specification, the present disclosure has been described with reference to specific exemplary embodiments thereof. Various embodiments and aspects of the present disclosure are described with reference to details discussed herein, and the accompanying drawings illustrate the various embodiments. The description above and drawings are illustrative of the present disclosure and are not to be construed as limiting the present disclosure. Numerous specific details are described to provide a thorough understanding of various embodiments disclosed herein.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A method for communication, comprising:
mapping a network device to a primary datacenter;
receiving a primary address associated with the primary datacenter;
storing the primary address;
mapping the network device to a secondary datacenter while maintaining the mapping to the primary datacenter;
receiving a secondary address associated with the secondary datacenter;
storing the secondary address while retaining the primary address;
receiving a primary media bridge connection from the primary datacenter, wherein the primary media bridge provides a first communication path between the network device and a second network device;
establishing a communication session between the network device and the second network device using the primary media bridge connection; and
receiving a secondary media bridge connection from the secondary datacenter while maintaining the established communication session between the network device and the second network device using the primary media bridge connection, wherein the secondary media bridge connection provides a second communication path between the network device and the second network device.

2. The method of claim 1, further comprising establishing a communication session via the primary datacenter while maintaining the mapping to the secondary datacenter.

3. The method of claim 2, wherein establishing the communication session comprises receiving session initiation protocol signaling from the primary datacenter.

4. The method of claim 2, further comprising requesting the primary media bridge connection from the primary datacenter.

5. The method of claim 4, further comprising determining a quality rating of the primary media bridge connection, wherein establishing the communication session between the network device and the second network device using the primary media bridge connection is based on the quality rating.

6. The method of claim 5, wherein the primary datacenter and the secondary datacenter are located in separate geographic locations.

7. The method of claim 6, wherein maintaining the established communication session between the network device and the second network device using the primary media bridge connection comprises transmitting the communication session between the network device and the second network device over the primary media bridge connection.

8. The method of claim 7, further comprising detecting a fault in a data connection that maps the network device to the primary datacenter.

9. The method of claim 8, wherein the secondary media bridge connection differs from the primary media bridge connection.

10. The method of claim 9, further comprising detecting a fault in the primary media bridge connection.

11. The method of claim 10, further comprising switching from the primary media bridge connection to the secondary media bridge connection upon detecting ft the fault in the primary media bridge connection.

12. The method of claim 11, further comprising sending communications over the secondary media bridge while maintaining the mapping to the primary datacenter.

13. The method of claim 1, wherein the network device is a voice-over internet protocol device.

14. The method of claim 1, further comprising storing the primary address and storing the secondary address.

15. A method for communication on a voice-over internet protocol network, comprising:
- mapping a first voice-over internet protocol device to a primary datacenter and a secondary datacenter;
- receiving a primary address from the primary datacenter;
- receiving a secondary address from the secondary datacenter;
- requesting a primary media bridge connection from the primary datacenter, wherein the primary media bridge connection provides a first communication path between the first voice-over internet protocol device to a second voice-over internet protocol device;
- establishing a communication session between the first voice-over internet protocol device and the second voice-over internet protocol device via the primary media bridge;
- requesting a secondary media bridge connection from the secondary datacenter while maintaining the established communication session between the first voice-over internet protocol device and the second voice-over internet protocol device using the primary media bridge connection, wherein the secondary media bridge connection provides a second communication between the first voice-over internet protocol device to the second voice-over internet protocol device;
- detecting a fault in the primary media bridge connection; and
- switching the communication session from the primary media bridge connection to the secondary media bridge connection upon detecting the fault in the primary media bridge connection.

16. The method of claim 15, further comprising:
- establishing a primary datacenter connection with the primary datacenter upon receiving the primary address, wherein the network device actively employs the primary datacenter connection; and
- establishing a secondary datacenter connection with the secondary datacenter upon receiving the secondary address, wherein the network device does not actively employ the secondary datacenter connection.

17. The method of claim 16, further comprising detecting a fault in the primary datacenter connection.

18. The method of claim 17, further comprising actively employing the secondary datacenter upon detecting the fault in the primary datacenter connection.

19. A system for voice-over internet protocol communication, comprising:
- at least one processor; and
- at least one non-transitory computer readable storage medium storing instructions thereon that, when executed by the at least one processor, cause the system to:
- map a first voice-over internet protocol device to a primary datacenter and a secondary datacenter;
- receive a primary address from the primary datacenter;
- receive a secondary address from the secondary datacenter;
- request a primary media bridge connection from the primary datacenter, wherein the primary media bridge connection provides a first communication path between the first voice-over internet protocol device to a second voice-over internet protocol device;
- establish a communication session between the first voice-over internet protocol device and the second voice-over internet protocol device;
- request a secondary media bridge connection from the secondary datacenter while maintaining the established communication session between the first voice-over internet protocol device and the second voice-over internet protocol device using the primary media bridge connection, wherein the secondary media bridge connection provides a second communication path between the first voice-over internet protocol device to the second voice-over internet protocol device;
- detect a fault in the primary media bridge connection; and
- switch from the primary media bridge connection to the secondary media bridge connection upon detecting the fault in the primary media bridge connection.

20. The system of claim 19, further comprising instructions thereon that, when executed by the at least one processor, cause the system to:
- establish a primary datacenter connection with the primary datacenter upon receiving the primary address, wherein the network device actively employs the primary datacenter connection; and
- establish a secondary datacenter connection with the secondary datacenter upon receiving the secondary address, wherein the network device does not actively employ the secondary datacenter connection.

* * * * *